(12) United States Patent
Zou

(10) Patent No.: US 11,368,476 B2
(45) Date of Patent: Jun. 21, 2022

(54) DATA-DEFINED ARCHITECTURE FOR NETWORK DATA MANAGEMENT

(71) Applicant: Helios Data Inc., Mountain View, CA (US)

(72) Inventor: Fei Zou, Menlo Park, CA (US)

(73) Assignee: Helios Data Inc., Mountain View, CA (US)

( * ) Notice: Subject to any disclaimer, the term of this patent is extended or adjusted under 35 U.S.C. 154(b) by 661 days.

(21) Appl. No.: 16/282,144

(22) Filed: Feb. 21, 2019

(65) Prior Publication Data

US 2019/0260787 A1    Aug. 22, 2019

Related U.S. Application Data

(60) Provisional application No. 62/794,676, filed on Jan. 20, 2019, provisional application No. 62/685,375, (Continued)

(51) Int. Cl.
*G06N 20/00* (2019.01)
*H04L 41/16* (2022.01)
(Continued)

(52) U.S. Cl.
CPC ...... *H04L 63/1425* (2013.01); *G06F 21/6236* (2013.01); *G06N 3/08* (2013.01); (Continued)

(58) Field of Classification Search
CPC ...... G06F 21/6236; G06N 3/08; G06N 20/00; H04L 41/142; H04L 41/16; H04L 63/10; (Continued)

(56) References Cited

U.S. PATENT DOCUMENTS 6,597,777 B1 * 7/2003 Ho ............... H04L 41/0896
370/235
10,367,843 B1 * 7/2019 Mezic ............... G06K 9/627
(Continued)

OTHER PUBLICATIONS

Egnyte Protect Overview, Egnyte Community, https://helpdesk.egnyte.com/hc/en-us/articles/115000099332-Egnyte-Protect-Overview, © 2019 Egnyte, Inc., 4 pages. [Retrieved Feb. 21, 2019].
(Continued)

*Primary Examiner* — Thomas J Dailey
(74) *Attorney, Agent, or Firm* — Kowert, Hood, Munyon, Rankin & Goetzel, P.C.

(57) ABSTRACT

Techniques are disclosed relating to data management. A computer system may evaluate network traffic to extract and group data objects based on their content satisfying similarity criteria, and to identify baseline behavior with respect to those data objects. The computer system may generate data-defined network (DDN) data structures that include a content class and one or more behavioral classes. The content class may be indicative of one or more of the data objects that have been grouped based on them satisfying the similarity criteria. The one or more behavioral classes may indicate baseline behavior of those data objects within the content class as determined from evaluation of the network traffic. The computer system may detect, using the DDN data structures, anomalous data behavior within network (Continued)

traffic. In response to detecting anomalous data behavior, the computer system may prevent network traffic corresponding to the anomalous data behavior from being communicated.

17 Claims, 11 Drawing Sheets

Related U.S. Application Data filed on Jun. 15, 2018, provisional application No. 62/633,834, filed on Feb. 22, 2018.

(51) Int. Cl.
*G06N 3/08* (2006.01)
*H04L 41/142* (2022.01)
*G06F 21/62* (2013.01)
*H04L 9/40* (2022.01)

(52) U.S. Cl.
CPC ........... *G06N 20/00* (2019.01); *H04L 41/142* (2013.01); *H04L 41/16* (2013.01); *H04L 63/10* (2013.01); *H04L 63/104* (2013.01); *H04L 63/1441* (2013.01)

(58) Field of Classification Search
CPC .............. H04L 63/104; H04L 63/1425; H04L 63/1441
See application file for complete search history.

(56) References Cited

U.S. PATENT DOCUMENTS

| 2005/0262560 | A1* | 11/2005 | Gassoway ............. H04L 63/145 726/22 |
| 2013/0305357 | A1* | 11/2013 | Ayyagari ........... H04B 7/18593 726/22 |
| 2014/0157405 | A1* | 6/2014 | Joll ..................... H04L 63/1425 726/22 |
| 2015/0229661 | A1* | 8/2015 | Balabine ............. H04L 63/1425 726/22 |
| 2016/0006755 | A1 | 1/2016 | Donnelly et al. |
| 2017/0063893 | A1* | 3/2017 | Franc ..................... G06F 21/53 |
| 2018/0025011 | A1 | 1/2018 | Aksionkin et al. |

OTHER PUBLICATIONS

International Search Report and Written Opinion in Appl. No. PCT/US2019/019087 dated May 7, 2019, 9 pages.
Lazarevic, et al., "A Comparative Study of Anomaly Detection Schemes in Network Intrusion Detection," Proceedings of the SIAM International Conference on Data Mining, Mar. 1, 2003, pp. 1-12.

* cited by examiner

US 11,368,476 B2

DATA-DEFINED ARCHITECTURE FOR NETWORK DATA MANAGEMENT

RELATED APPLICATIONS

The present application claims priority to U.S. Provisional Appl. Nos. 62/794,676 filed Jan. 20, 2019, 62/685,375 filed Jun. 15, 2018, and 62/633,834 filed Feb. 22, 2018; each of these applications is incorporated by reference herein in their entireties.

BACKGROUND

Technical Field

This disclosure relates generally to a data management system.

Description of the Related Art

The amount of data used by and accessible to computer systems is extremely large, and growing quickly. One estimate is that in 2016, there is approximately 11,000 exabytes of such information, which was expected to climb to around 52,000 Exabytes in 2020. Rizzatti, Dr. Lauro. "Digital Data Storage Is Undergoing Mind-Boggling Growth." EETimes, 14 Sep. 2016. This article states that unstructured data (e.g., documents, photos, videos, etc.) accounts for most of the available data. In addition to typically being unstructured, data is often scattered around layers of a network (e.g., a cloud network, a data center network, a corporate network, etc.) with poor structuring and visibility. Given that data is often scattered and unstructured, this makes ensuring proper handling of the data quite difficult.

That data often includes certain classes of information that is either legally required to be treated in a particular manner (as in the case of government regulation) or is desired to be treated in some fashion (as in the case with an enterprise data management policy). But since data is often scattered and unstructured, protecting that data or even ensuring that it is properly handled is impractical as the necessary understanding of what data is stored, how it is stored, where it is stored, and/or how it is used is simply not there or severely limited.

In some cases, companies are legally mandated to handle certain data in a particular way. For example, in the health care context, health care enterprises commonly store records for their patients that identify personal health information (PHI) such as demographic information, medical history information, insurance information, etc. These records are usually in an unstructured format (e.g., photos, videos, e-mail messages, WORD documents, portable document format (PDF), etc.), making it easy for an employee to store those records with other types of information. Since PHI may be mixed with other types of information, it is difficult to identify all locations where PHI is stored in an on-premise file system or in cloud storage. Health care enterprises often need to exchange records that do not include PHI with other enterprises, while also complying with Health Insurance Portability and Accountability Act (HIPPA) provisions that set out requirements for protecting PHI. Since a health care enterprise does not know where all its PHI is stored, that health care enterprise may unknowingly provide another enterprise with access to a database that stores records with PHI that should not be accessed by the other enterprise. Thus, data can be a liability for companies that do not have the mechanisms in place to properly management it.

Even aside from legal mandates, data security management is of paramount importance in ensuring proper internal usage of data. Data security management is normally performed by controlling access on the boundaries of a computer network. But once the network's perimeter defenses (e.g., firewalls) are breached, there is normally little (if any) interior defense to prevent malware (e.g., a virus) from roaming and attacking the network by damaging or stealing sensitive data. In some cases, an "interior defense" strategy may involve an agent-based defense that requires every susceptible device in the network to run a localized security process. But each device in this approach represents a point of weakness within the network because if a single local process is out of date, disabled by a user, or has already been compromised, then this could lead to a significant data breach.

Figure 1:
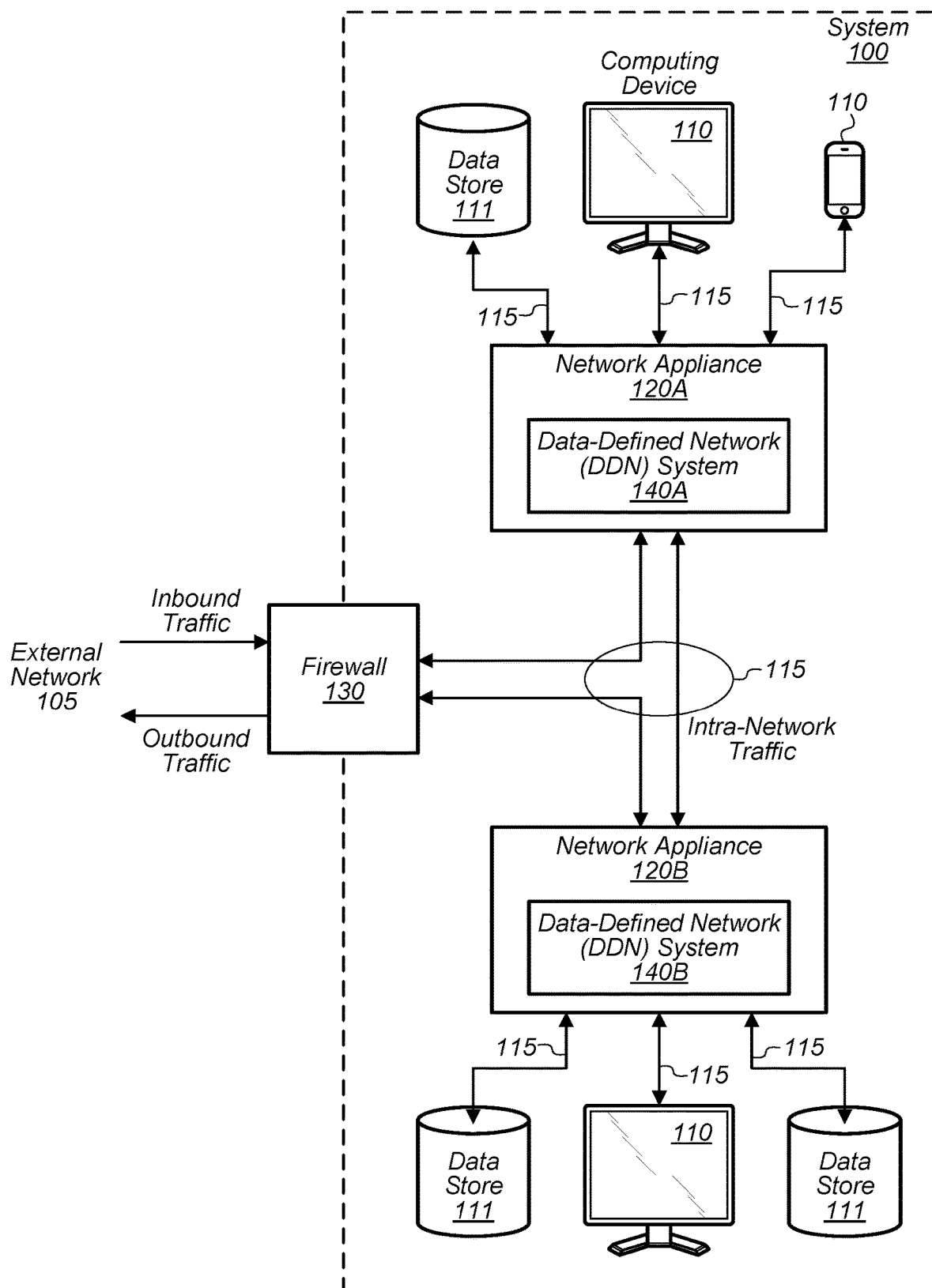
FIG. 1 is a block diagram illustrating example elements of a system that includes a data-defined network (DDN) system, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "network interface configured to communicate over a network" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a data structure that has multiple classes, the terms "first" class and "second" class can be used to refer to any class of the data structure. In other words, the first and second classes are not limited to the initial two classes of a data structure.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

Managing data from the vantage point of the network perimeter is increasingly challenging, particularly with the current and expected further proliferation in governmental data usage regulations worldwide. To address such problems, the present disclosure sets forth a "data-defined" approach to data management. In this approach, data management problems can largely be seen as anomalous behavior of data, which can be addressed by classifying data in a network, defining "normal behavior" (or "anomalous behavior," which refers to any improper use of data relative to some standard or data policy, whether or not that use is malicious), and then instituting an enforcement mechanism that ensures that anomalous data usage is controlled.

The current content and nature of data within a given computer network is typically poorly understood. Conventional infrastructure-driven approaches to network organization and data management are not concerned with what different types of data are present within a network and how that data normally behaves (whether that data is in use, at rest, or in transit), which puts such data management paradigms at a severe disadvantage when dealing with novel threats.

Data management broadly refers to the concept of ensuring that data is used in accordance with a policy objective. (Such "use" of the data includes the manner in which the data is stored, accessed, or moved.) The concept of data management thus includes data security (e.g., protecting data from malware attacks), data compliance (e.g., ensuring control of personal data is managed in accordance with a policy that may be established by a governmental organization), as well as permissioning that enforces entity-specific policies (e.g., certain groups in a company can access certain projects). The present disclosure describes a "data-defined" approach to data management, resulting in what is described as a "data-defined network" (DDN)—that is, a network (or portion of a network) that implements this data-defined approach.

Broadly speaking, a DDN stores one or more DDN data structures through which data in a network is organized and managed on the basis of observed attributes of the data and data usage policies, rather than infrastructure-driven factors, such as the particular physical devices or locations where that data is stored. In this manner, a set of DDN data structures may form the building block of a DDN and incorporate multiple dimensions of relevant data attributes to facilitate capturing the commonality of data in a network. In some embodiments, a given one of the set of DDN data structures in a particular network may correspond to a set of data objects (e.g., files) that have similar content (e.g., as defined by reference to some similarity metric) and may indicate a baseline behavior for that set of objects. As used herein, the term "observed behavior" refers to how data objects are observed to be used within a network; observed behavior may be determined through a learning or training phase as described in this disclosure. For example, if a document is exchanged between two computer systems, then exchanging that document between those two systems is said to be an example of observed behavior for that document.

When describing the behavior of data, the term "behavior" refers to actions performed on data, characteristics of those actions, and characteristics of those entities involved in the actions. Actions performed on the data may include without limitation reading, writing, deleting, transmitting, etc. Characteristics of those actions refers to properties of the actions being performed beyond the types of actions being performed on the data. Such characteristics may include without limitation the protocols used in those actions, the time when the action was initiated, the specific data involved in the action, parameters passed as part of the action, etc. Finally, data behavior also includes the identity and/or characteristics of the entities involved in the actions. Thus, if observed data behavior includes the transmission of data from user A to user B from a software entity C, data behavior can include information about user A, user B, and software entity C. Characteristics of the entities involved in the actions may include without limitation type of application transmitting the data, the type of system (e.g., client, server, etc.) running the application, etc. Accordingly, data behavior is intended to broadly encompass any information that can be extracted by a computer system when an operation is performed on a data object.

Once the observed behavior of a data object is determined, this information may be used to define the baseline behavior of the data object. The term "baseline behavior" (alternatively, "normal behavior" or "typical behavior") refers to how a data object is expected to behave within a network, which, in many cases, is specified by observed behavior, as modified by a user. Baseline behavior may thus be the observed behavior, or the observed behavior plus modifications specified by the user. Consider an example in which one observed behavior of a document is that the document is exchanged between three computer systems A, B, and C. The baseline behavior may be that the document can be exchanged between the three computer systems (which matches the observed behavior) or, because of user-intervention for example, the baseline behavior may also be that the document can be exchanged between computer systems A and B and D. When later evaluating data behavior, the term "anomalous behavior" refers to behavior of a data objects that deviates from the baseline behavior for that data object. A given DDN data structure may, in some cases, indicate data usage policies for handling anomalous usage (e.g., preventing such usage or generating a message).

The organization of a DDN data structure that indicates content and behavior information is described herein as including a "content class" and a "behavior class." This description is to be interpreted broadly to include any information that indicates a set of data objects that have similar content, in addition to baseline or typical behaviors for those data objects. As used herein, the term "class" refers to a collection of related information derived from a classification process. For example, a content class may identify individual data objects that are determined to be related to one another based on their content, and may further include features that describe the data objects and/or attributes of their content. A behavioral class may indicate a behavior of a data object, and may include specific behavioral features that define the associated behavior. These terms are not intended to be limited to any particular data structure format such as a "class" in certain object-oriented programming languages, but rather are intended to be interpreted more broadly.

In various embodiments that are described below, one or more DDN data structures are generated utilizing artificial intelligence (AI) algorithms (e.g., machine learning algorithms) to associate or link data objects having similar data content with their behavioral features and are then deployed to detect anomalous behavior and/or non-compliance with policy objectives. In various cases, the generation and deployment of DDN data structures may occur in two distinct operational phases.

During a learning phase, similarity detection and machine learning techniques may be used to associate data objects having similar data content and to identify the behavioral features of those data objects in order to generate a DDN data structure. In various embodiments, a user provides data object samples to be used in the learning phase. The data object samples that are provided by a user may be selected to achieve a particular purpose. In many cases, a user may select data object samples that have data that is deemed critical or important by the user. For example, a user may provide data object samples that have payroll information. Each of these samples may form the initial building block of a DDN data structure. After the data object samples have been received and processed, network traffic may be evaluated to extract data objects that may then be classified (e.g., using a similarity detection technique or a content classification model) in order to identify at least one of the data object samples with which the extracted data object shares similar content attributes. The content and behavioral features of that extracted data object may be collected and then provided to a set of AI algorithms to train the content classification model and a behavioral classification model. A DDN data structure, in various embodiments, is created to include a content class (of the content classification model) that corresponds to a sample and extracted data objects that are similar to that sample and to include one or more behavioral classes (of the behavioral classification model) that are associated with the behavioral features exhibited by those data objects.

During an enforcement phase, network traffic may be evaluated to extract data objects and to determine if those extracted data objects are behaving anomalously. In a similar manner to the learning phase, extracted data objects may be classified to determine if they fall within a content class of one of the DDN data structures—thus ascertaining whether they include content that is similar to previously classified content. In some embodiments, if a data object is associated with a content class, then its behavioral features are collected and classified in order to identify whether the current behavior of that data object falls within any of the behavioral classes associated with that content class. If the current behavior falls within one of the behavioral classes, then that data object can be said to exhibit normal or typical behavior; otherwise, that data object is behaving anomalously and thus a corrective action may be taken (e.g., prevent the data object from reaching its destination and log the event). In various cases, however, a data object may not comply with a policy objective and thus a corrective action may also be taken in such cases.

These techniques may be advantageous over prior approaches as these techniques allow for better data management based on a better understanding of the behavior of data. More specifically, in using these techniques, a baseline behavior may be identified for data objects along with other information such as the relationships between those data objects. By understanding how a data object is routinely used, anomalous behavior may be more easily detected as the current behavior of a data object may be compared against how it is routinely used. This approach is distinct from, and complementary to, traditional perimeter-based solutions. For example, some solutions may control access to data based on who is accessing that data; in contrast, the techniques of the present disclosure can detect abnormal uses of data even from users who have permission to access that data. For example, suppose a particular user has access to certain data in a particular location, and typically accesses only a few files at a time. Using techniques of the present disclosure, if it is determined that the user is attempting to download all or a large portion of the data in the particular location, this usage may be categorized as abnormal and prevented.

Because a DDN data structure may be used to identify data objects and their associated behavior and to enforce policy objectives against those data objects, this may enable a user to modify or refine the behavior of those data objects. As an example, subsequent to discovering a data management issue involving the misuse of certain data objects, a user may alter a policy to narrow the acceptable uses of those data objects. After mitigating a data management issue, a DDN data structure may adjust (or a new one may be generated) to identify the new baseline behavior of the data objects in view of the data management issue being mitigated. As such, a DDN data structure may continue to be used to track data behavior and identify any anomalous behavior, thereby helping to protect data from known and unknown data management issues.

Additionally, the techniques of the present disclosure may be used to discover previously unknown locations in a user's network where data of interest is stored. This may allow for the protection of a class of data even if all the particular locations where that class of data is stored are not known. For example, a system administrator or other individual may be unaware that one of their databases stores files that include personal information; without this information, the administrator will not be able to specify that database for protection. But the techniques discussed herein may identify an unknown database through networking monitoring. For example, suppose that a data object having personal information is extracted from network traffic while in transit from a database that has not been identified by a system administrator. The techniques discussed herein may determine that the personal information included in that data object is data that the system administrator wants protect. Accordingly, since the database includes a data object with personal information, the techniques discussed herein may scan the database for more data objects that contain personal information. In this manner, unspecified locations may be discovered that store data of interest to an individual. This is in contrast to prior approaches in which users needed to know where their data was stored before they could protect it. As such, a user may benefit from a greater insight into where data is located.

The techniques of the present disclosure may perform a more granular classification of data than prior approaches. In prior approaches, data may be classified with broad labels such as financial information. In contrast, the techniques discussed herein may analyze the content of files to identify correlations that exist among those files and other files, users, application, and/or networks. For example, suppose that a certain document includes financial information about a particular user. The techniques discussed herein may classify that document as financial information, but may further classify the document has belonging to the particular user. In this manner, the contents of data objects may be classified beyond providing a label for the data objects themselves.

Accordingly, users may be able to more easily comply with governmental regulations that attempt to control how certain data (e.g., PHI) should be handled because these techniques may establish the behavior of data and permit those users to conform that behavior in accordance with those governmental regulations. Various embodiments for implementing these techniques will now be discussed.

Turning now to FIG. 1, a block diagram of a system 100 that incorporates multiple data-defined network systems 140 is depicted. In the illustrated embodiment, system 100 includes computing devices 110, data stores 111, network appliances 120, and a firewall 130. As further depicted, each network appliance 120 includes a DDN system 140. While system 100 is shown as a single network of computing systems enclosed by a firewall, in some embodiments, system 100 expands across multiple networks that each have computing systems that are enclosed by their own respective firewalls. In some embodiments, system 100 is implemented differently than shown—e.g., system 100 may include DDN systems 140, but not firewall 130.

System 100, in various embodiments, is a network of components that are implemented via hardware or a combination of hardware and software routines. As an example, system 100 may be a database center housing database servers, storage systems, network switches, routers, etc., all of which may comprise an internal network separate from external network 105 such as the Internet. In some embodiments, system 100 includes components that may be located in different geological areas and thus may comprise multiple networks. For example, system 100 may include multiple database centers located around the world. Broadly speaking, however, system 100 may include a subset or all of the components associated with a given entity (e.g., an individual, a company, an organization, etc.).

Computing devices 110, in various embodiments, are devices that perform a wide range of tasks by executing arithmetic and logical operations (via computer programming). Examples of computing devices 110 may include, but are not limited to, desktops, laptops, smartphones, tablets, embedded systems, and server systems. While computing devices 110 are depicted as residing behind firewall 130, a computing device 110 may be located outside firewall 130 (e.g., a user may access a data store 111 from their laptop using their home network) while still being considered part of system 100. In various embodiments, computing devices 110 are configured to communicate with other computing devices 110, data stores 111, and devices that are located on external network 105, for example. That communication may result in intra-network traffic 115 that is routed through network appliances 120.

Network appliances 120, in various embodiments, are networking systems that support the flow of intra-network traffic 115 among the components of system 100, such as computing devices 110 and data stores 111. Examples of network appliances 120 may include, but are not limited to, a network switch (e.g., a Top-of-Rack (TOR) switch, a core switch, etc.), a network router, and a load balancer. Since intra-network traffic 115 flows through network appliances 120, they may serve as a deployment point for a DDN system 140 or at least portions of a DDN system 140 (e.g., an enforcement engine that determines whether to block intra-network traffic 115). In various embodiments, network appliances 120 include a firewall application (and thus serve as a firewall 130) and a DDN system 140; however, they may include only a DDN system 140.

Firewall 130, in various embodiments, is a network security system that monitors and controls inbound and outbound network traffic based on predetermined security rules. Firewall 130 may establish, for example, a boundary between the internal network of system 100 and an untrusted external network, such as the Internet. During operation, in various cases, firewall 130 may filter the network traffic that passes between the internal network of system 100 and networks external to system 100 by dropping the network traffic that does not comply with the ruleset provided to firewall 130. For example, if firewall 130 is designed to block telnet access, then firewall 130 will drop data packets destined to Transmission Control Protocol (TCP) port number 23, which is used for telnet. While firewall 130 filters the network traffic passing into and out of system 100, in many cases, firewall 130 provides no internal defense against attacks that have breached firewall 130 (i.e., have passed through firewall 130 without being detected by firewall 130). Accordingly, in various embodiments, system 100 includes one or more DDN systems 140 that serve as part of an internal defense mechanism.

DDN systems 140, in various embodiments, are data management systems that monitor and control the flow of network traffic (e.g., intra-network traffic 115) and provide information that describes the behavior of data and its relationships with other data, applications, and users in order to assist users in better managing that data. As mentioned earlier, a DDN system 140 may use DDN data structures to group data objects that have similar content and to establish a baseline behavior for those data objects against which policies may be applied to modify the baseline behavior in some manner. The generation and deployment of a DDN data structure may occur in two operational phases.

In a learning phase, in various embodiments, a DDN system 140 (or a collection of DDN systems) learns the behavior of data objects by inspecting intra-network traffic 115 to gather information about the content and behaviors of data objects in traffic 115 and by training content and behavioral models utilizing that gathered information. Accordingly, through continued inspection of intra-network traffic 115, baseline or typically behaviors of data objects may be learned, against which future intra-network traffic 115 observations may be evaluated to determine if they conform to the expected behavior, or instead represent anomalous behavior that might warrant protective action. The set of typical behaviors may be altered by a user such as a system administrator in some embodiments, resulting in an updated baseline set of operations permissible for a given group of data objects. That is, if a user finds that the typical behavior of a data object is undesirable, then the user may restrict that behavior by defining policies in some cases.

In an enforcement phase, in various embodiments, a DDN system 140 determines if a data object is exhibiting anomalous behavior by gathering information in a similar manner to the learning phase and by classifying that gathered information to determine whether that data object corresponds to a particular DDN data structure and whether its behavior is in line with the behavior baseline and the policy objectives identified by that DDN data structure. If there is a discrepancy between how the data object is being used and how it is expected to be used, then a DDN system 140 may perform a corrective action. It is noted that a data object may be determined to exhibit anomalous behavior based on either its content or its detected behavior attributes, or a combination of these. Anomalous behavior may include use of malicious content (e.g., a virus) as well as unexpected use of benign (but possibly sensitive) content. Thus, the techniques described herein can be used to detect content that should not be in the system, as well as content that is properly within the system, but is either in the wrong location or being used by users without proper permissions or in an improper manner.

By identifying a baseline behavior for a data object and then taking corrective actions (e.g., dropping that data object from intra-network traffic 115) for anomalous behavior, a DDN system 140 may enforce policy objectives. For example, if malware is copying PHI records to an unauthorized remote server, a DDN system 140 can drop those records from intra-network traffic 115 upon determining that copying those records to that unauthorized remote server is not baseline behavior or in line with HIPPA policies, for example. Moreover, by continually observing data, a DDN system may provide users with an in-depth understanding of how their data is being used, where it is being stored, etc. With such knowledge, users may learn of other issues pertaining to how data is being used in system 100 and thus may be able to curtail those issues by providing new policies or altering old policies. The particulars of a DDN system 140 will now be discussed in greater detail below.

Figure 2:
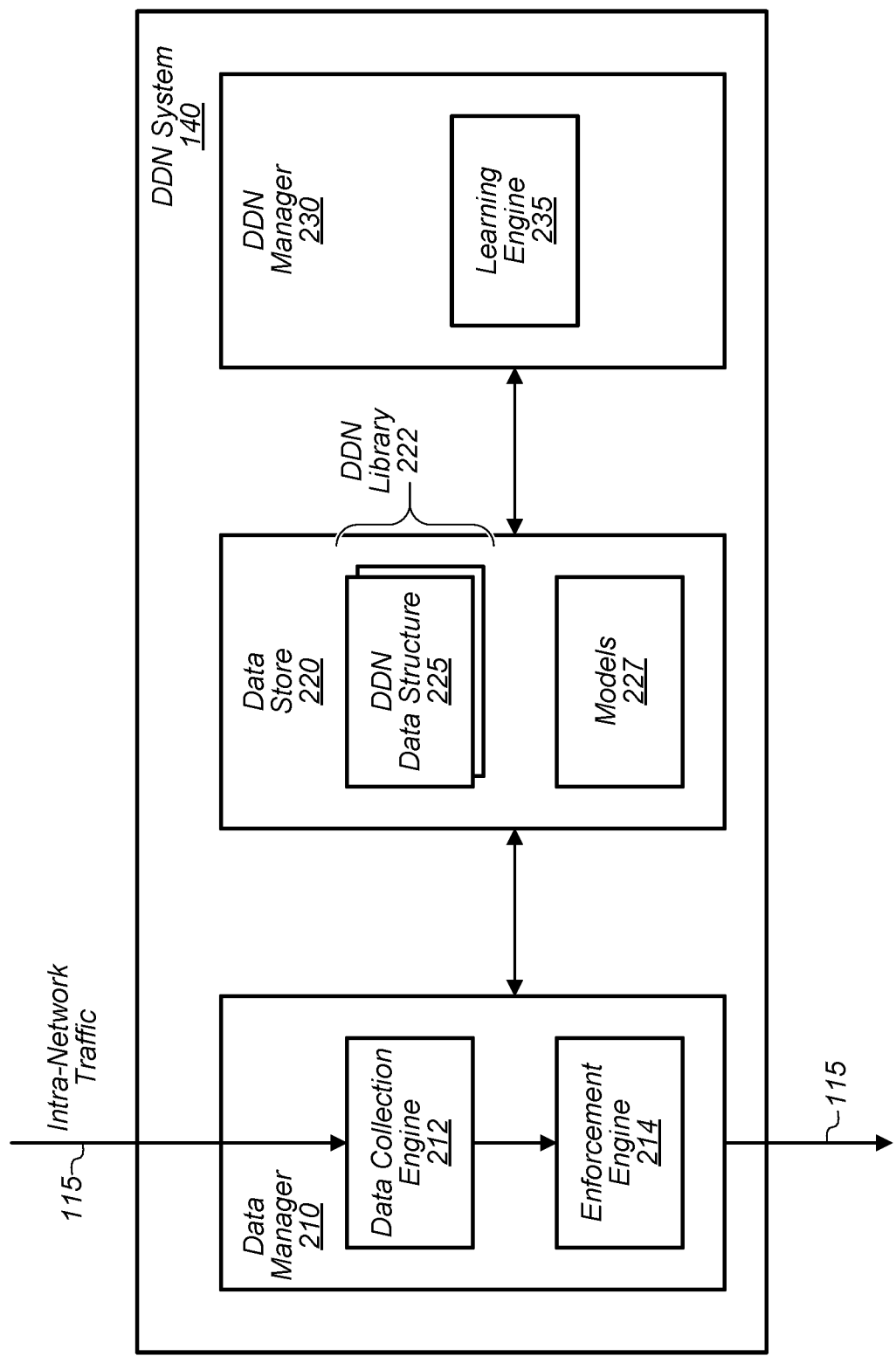
FIG. 2 is a block diagram illustrating example elements of a DDN system, according to some embodiments.

Turning now to FIG. 2, a block diagram of an example DDN system 140 is shown. In the illustrated embodiment, DDN system 140 includes a data manager 210, a data store 220, and a DDN manager 230. As shown, data manager 210 includes a data collection engine 212 and an enforcement engine 214; data store 220 includes a DDN library 222 (which in turn has a set of DDN data structures 225) and models 227; and DDN manager 230 includes a learning engine 235. While DDN systems 140 are shown as residing at network appliances 120 in FIG. 1, some components of a DDN system 140 may reside at other locations—e.g., because learning engine 235 may not need to inspect intra-network traffic 115, it may be located at a different place in system 100. In some embodiments, DDN system 140 may be implemented differently than is shown—e.g., data manager 210 and DDN manager 230 may be the same component.

Data manager 210, in various embodiments, is a set of software routines that monitors and controls the flow of data in intra-network traffic 115. For example, data manager 210 may monitor intra-network traffic 115 for data objects that are behaving anomalously and drop the data objects from intra-network traffic 115. To monitor and control the flow of data, in various embodiments, data manager 210 includes data collection engine 212 that identifies and collects the content and behavioral features (examples of which are discussed with respect to FIG. 4) of data objects that correspond to data samples provided by users of DDN system 140. (Such samples may be those types of data deemed important from the standpoint of an entity—for example, Social Security numbers or a user's private health information.) The content and behavioral features may then be stored in data store 220 for analysis by DDN manager 230. Data collection engine 212 is described in greater detail below with respect to FIG. 3.

Data store 220, in various embodiments, is a repository that stores DDN data structures 225 and models 227. In a sense, data store 220 may be considered a communication mechanism between data manager 210 and DDN manager 230. As an example, the content and behavioral features extracted from data objects may be stored in data store 220 so that learning engine 235 may later use those features to train machine learning models 227 and to create a DDN library 222 of DDN data structures 225. Moreover, enforcement engine 214 may retrieve models 227 and DDN data structures 225 from data store 220 in order to control the flow of intra-network traffic 115.

DDN manager 230, in various embodiments, is a set of software routines that facilitates the generation and maintenance of DDN data structures 225. Accordingly, the features that are collected from data objects may be passed to learning engine 235 for training models 227. For example, as described below, machine learning classification algorithms may be performed to classify data objects by their content, their behavior, or both. The content classes that are created, in various embodiments, are each included in (or indicated by) a respective DDN data structure 225. Accordingly, when identifying a particular DDN data structure 225 to which a data object belongs, a general content model 227 may be used to classify the data object into a DDN data structure 225 based on its content class. The behavioral classes that are created, for a given behavioral model 227 (as there might, in some cases, be a behavioral model 227 for each DDN data structure 225), may all be included in the same DDN data structure 225. Thus, in various embodiments, a DDN data structure 225 includes a content class and one or more behavioral classes. The contents of a DDN data structure 225 are discussed in greater detail with respect to FIG. 2 and learning engine 235 is discussed in greater detail with respect to FIG. 5.

After DDN data structures 225 are created and the behavior baselines are learned (and potentially updated by a user), for any data objects detected within intra-network traffic 115, the content and behavioral features of that data object along with DDN data structures 225 may be pushed to enforcement engine 214 to detect possible anomalous behavior. The machine learning classification algorithms that were mentioned earlier may be performed on the content and behavioral features to ascertain if that data object is similar to established data objects (e.g., based on its content) and whether its behavior conforms to what is normal for those established data objects (e.g., in compliance with specified policy objectives), or what is instead anomalous.

Figure 8:
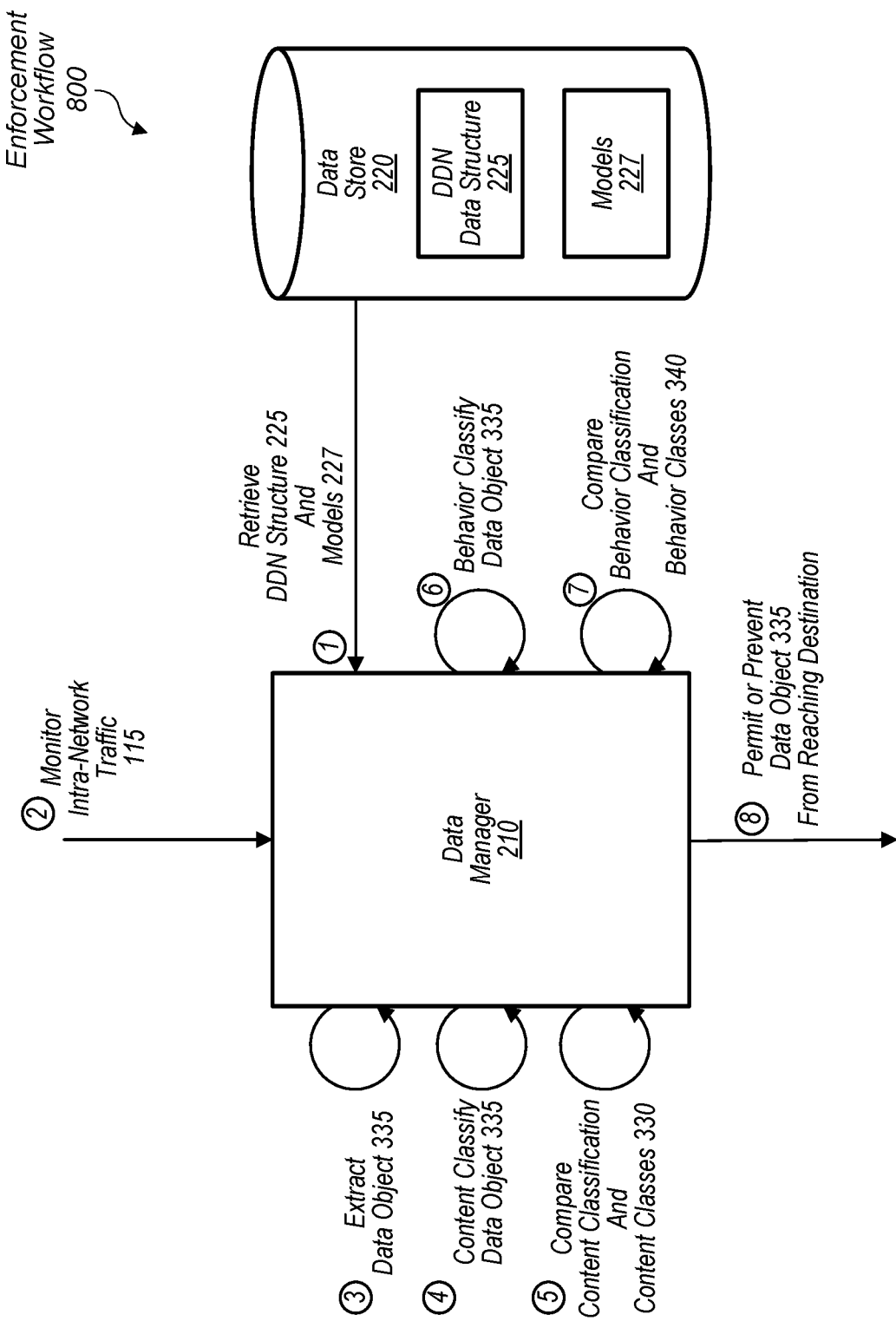
FIG. 8 is a block diagram illustrating example elements of an enforcement workflow, according to some embodiments.

In the discussions that follow, examples of how the learning phase is implemented are discussed (with an example of a learning workflow presented in FIG. 6), followed by examples of how the enforcement phase is implemented (with an example of an enforcement workflow presented in FIG. 8).

Figure 3:
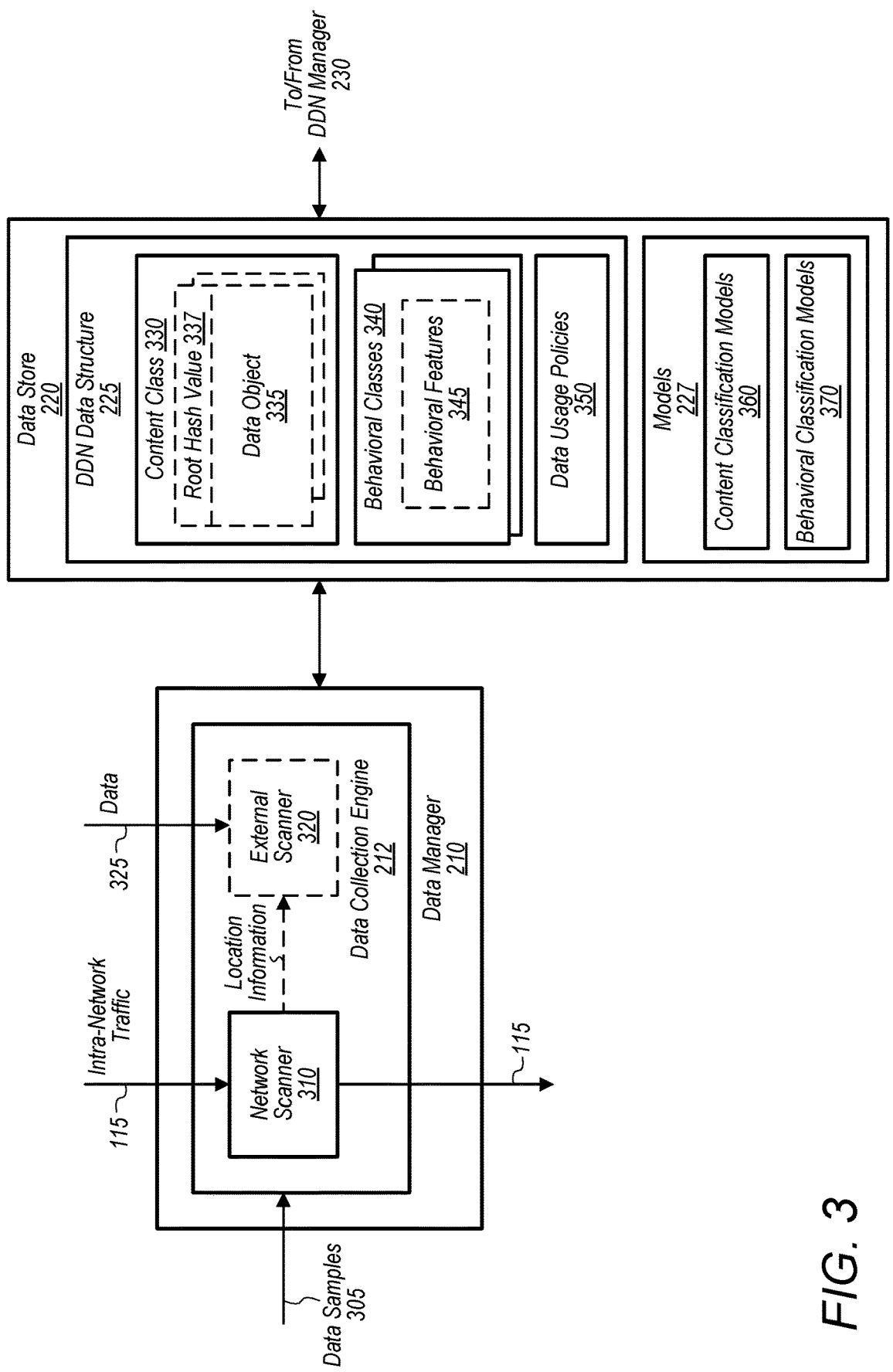
FIG. 3 is a block diagram illustrating example elements of a DDN data structure and a data collection engine of a DDN system, according to some embodiments.

Turning now to FIG. 3, a block diagram of an example data manager 210 and data store 220 in the learning phase are shown. In the illustrated embodiment, data manager 210 includes a data collection engine 212, and data store 220 includes a DNN data structure 225 and models 227. As further depicted, data collection engine 212 includes network scanner 310 and external scanner 320. Also as shown, DDN data structure 225 includes a content class 330, data objects 335, behavioral classes 340, behavioral features 345, and data usage policies 350; models 227 include content classification model 360 and behavioral classification model 370. In some embodiments, data manager 210 and/or data store 220 may be implemented differently than is shown—e.g., external scanner 320 may be omitted.

The learning phase, in various embodiments, starts with a user providing data samples 305 that the user identifies. In some cases, these may be types of data deemed important to a particular organization. Data samples 305 may include, for example, documents that contain PHI, business secrets, user information, and other personal information. By providing data samples 305, the user may establish a baseline of the types of data that the user wishes to monitor and protect. That is, a user may not care, for example, about advertisements being improperly used, but may care about protecting Social Security numbers from being leaked and thus the user may provide data samples 305 in order to initially teach a DDN system 140 about the types of data that it should be monitoring and controlling.

Moreover, data samples 305 (which include content that user is aware of) may be used to discover similar or even the same content in locations that the user does not know store such content. For example, system 100 may store large amounts of unstructured data (e.g., PDFs, WORD documents, etc.) and thus files containing data that is relevant to the user may be buried in a directory that the user has forgotten about or did not know included this type of data. Accordingly, data samples 305 may be used to identify that a particular type of data is stored in previously unknown network locations. Furthermore, DDN data structures 225 (which may be built upon data samples 305), in some embodiments, may be used to discover data exhibiting similar properties to the data samples. This approach may provide a user with knowledge about data that is similar to the data samples.

Users provide data samples 305, in various embodiments, by granting access to the file storage (e.g., a network file system, a file transfer protocol server, or an application data store, each of which may be implemented by a data store 111) where those samples (e.g., data objects 335) are located. Data objects 335 may include files defined within a file system, which may be stored on storage systems (e.g., data stores 111) that are internal to the network of system 100, within the cloud (e.g., storage external to the network that may or may not be virtualized to appear as local storage), or in any other suitable manner. Although the following discussion refers to files, any type of data objects 335 may be employed, and it is not necessary that data objects 335 be defined within the context of a file system.

Instead of granting access to a file storage, in some embodiments, users may directly upload data samples 305 to data manager 210.

After accessing or receiving data samples 305, data collection engine 212 may generate a respective root hash value 337 (also referred to as a "similarity hash value") for one or more of the provided data samples 305. In various embodiments, when generating a root hash value 337, a data sample 305 is passed into a similarity algorithm that hashes that data sample using a piecewise hashing technique such as fuzzy hashing (or a rolling hash) to produce root hash values 337. The piecewise hashing technique may produce similar hash values for data objects 335 that share similar content and thus may serve as a way to identify data objects 335 that are relatively similar. Accordingly, each root hash value 337 may represent or correspond to a set or group of data objects 335. That is, each root hash value 337 may serve to identify the same and/or similar data objects 335 to a corresponding data sample 305 and may be used as a label for those data objects 335 (as illustrated) in order to group those data objects 335 with that data sample. In some embodiments, root hash values 337 are stored in data store 220 in association with their corresponding data sample 305 for later use. In some cases, data collection engine 212 may continuously monitor the provided data samples 305, and update the root hash value 337 when a corresponding data sample 305 is updated.

Once root hash values 337 have been calculated for the provided data samples 305, in various embodiments, data collection engine 212 may begin evaluating intra-network traffic 115 to identify data objects 335 that are similar to provided data samples 305. In some embodiments, this data collection process that is used in the learning phase only monitors intra-network traffic 115 without actually modifying it. (For this reason, enforcement engine 214 has been omitted from FIG. 3). In contrast, the data collection process used in the enforcement phase may operate to discard or otherwise prevent the transmission of intra-network traffic 115 that is determined to exhibit anomalous behavior. (In some cases, the enforcement phase may include taking some other action other than discarding or preventing transmission of a data object.)

Network scanner 310, in various embodiments, evaluates intra-network traffic 115 and attempts to reassemble the data packets into data objects 335 (e.g., files). Because data objects 335 are in transition to an endpoint that is assumedly going to use those data objects, network scanner 310 (and DNN system 140 as whole) may learn the behavioral features 345 (e.g., who uses those data objects, how often are they used, what types of applications request them, etc.) of those data objects. This approach provides greater visibility relative to only observing data objects 335 that are stored. For each data object 335 extracted from intra-network traffic 115, network scanner 310 may generate a root hash value 337 (e.g., using a piecewise hashing technique). If the root hash value 337 matches any root hash value 337 of the provided data samples 305 (note that a root hash value 337, in some embodiments, matches another root hash value 337 even if they are not exactly the same, but instead satisfy a similarity threshold (e.g., they are 80% the same root hash value 337)) and thus the corresponding data object 335 is at least similar to one of the provided data samples 305, then network scanner 310, in various embodiments, extracts the content and behavioral features 345 of that data object 335 and stores that information in data store 220. The content of that data object 335 (which may include a subset or all of a data object 335) may be labeled with the matching root hash value 337 (as illustrated with data object 335 having a root hash value 337) and associated with a content class 330 that may be labeled with the matching root hash value 337. (Note that the relationship between data objects 335 and content class 330 is depicted by data objects 335 being within content class 330, although data objects 335 are not necessarily stored in content class 330. In other words, content class 330 may simply include an indication of what data objects 335 correspond to this class.)

In some cases, network scanner 310 may not be able to evaluate data objects 335 from intra-network traffic 115 as those data objects may be, for example, encrypted. It is noted that if a data object 335 is encrypted, then the piecewise hashing technique may not be effective in determining if that data object is similar to a data sample 305. Accordingly, network scanner 310 may evaluate intra-network traffic 115 to identify, for data objects 335 in that traffic, where those data objects are stored (in addition to extracting their behavioral features 345). Network scanner 310 may then cause external scanner 320 to obtain the appropriate credentials and scan the repository where those data objects are stored to determine if they contain information that is relevant to users of DDN system 140. For example, if network scanner 310 extracts query results from intra-network traffic 115 that were sent by a MYSQL server, but the query results were encrypted by the MYSQL server, then external scanner 320 may be used to notify a user about the query results and to ask for access credentials so that it may scan the repository that is associated with that MYSQL server for relevant data. As shown, external scanner 320 may retrieve data 325 from locations where relevant data might be stored. Thus, external scanner 320, in various embodiments, is used when network scanner 310 cannot fully understand the contents of data objects 335.

While data objects 335 that have similar content to particular data samples 305 may be discovered by extracting them directly from intra-network traffic 115, in various embodiments, network scanner 310 and external scanner 320 may identify locations where data objects 335 are stored and then scan those locations to determine if there are data objects 335 of interest. In order to identify these locations, network scanner 310 may first discover a data object 335 that has similar content to a data sample 305 and then may determine the location where that data object is stored. That location may be subsequently scanned by, e.g., external scanner 320 for other matching data objects 335 (e.g., by determining if their root hash value 337 matches one of the root hash values 337 for samples 305). In some embodiments, users of DDN system 140 may direct data collection engine 212 to scan particular data repositories (e.g., data stores 111). Thus, instead of reactively discovering data objects 335 that have desired information by extracting them from intra-network traffic 115, data collection engine 212 may proactively find such data objects 335 by scanning data repositories. The content (e.g., data object 335) obtained through external scanner 320 and behavioral features 345 obtained through network scanner 310 may be stored in data store 220 for later processing. This process of identifying locations and scanning the locations may assist in identifying areas where relevant data is stored that are unknown to users of DDN system 140.

When a particular data object 335 matches a data object 335 (e.g., a data sample 305) already in data store 220 and its contents and behavioral features 345 have been extracted, then those contents and behavioral features 345 may be processed for training content classification model 360 and behavioral classification model 370, respectively. In various embodiments, this involves the application of unsupervised machine learning techniques to perform both content classification and identification of baseline behaviors of data objects 335, as discussed in more detail below. After content classification model 370 has been trained, this model may assist (or be used in place of) the piecewise hashing technique to identify data objects 335 that have similar content to data objects 335 associated with DDN data structures 225. For example, the piecewise hashing technique may not identify a desired data object 335 if that data is arranged or ordered in a significantly different manner than, e.g., data samples 305. But content classification model 360 may still be able to identify that such a data object 335 includes data of interest (e.g., by using a natural language processing (NLP)-based approach). Content classification model 360 may further allow for different types of data objects 335 (e.g., PDFs versus WORD documents) to be classified.

Moreover, after a possible location of specified data has been determined, in some embodiments, data collection engine 212 drives machine learning algorithms (that may utilize an NLP-based content classification model 360) to classify data objects 335 at that location to determine whether they correspond to a content class 330 of a DDN data structure 225. If a data object 335 contains data of interest, then its behavioral features 345 may be used by machine learning algorithms to train behavioral classification model 370 as part of building a behavioral baseline. Before providing the content and behavioral features 345 of a data object 335 to data store 220 and/or DDN manager 230, data collection engine 212 may normalize that information (e.g., by converting it into a text file). The normalized data object 335 may then be stored at data store 220 and a data ready message may be sent to the DDN manager 230 so that DDN manager 230 may download that data object 335 and train content classification model 360.

While the resulting classes (e.g., content classes 330 and behavioral classes 340) from trained content and behavioral classifications models 360 and 370, respectively, may form a portion of the DDN data structures 225 stored at data store 220, a DDN data structure 225 may also include data usage policies 350. These data usage policies 350 may be user-defined policies that are used to supplement or modify the baseline set of behaviors set forth by model 370—this may form a new baseline behavior. In some instances, data usage policies 350 may be, in part, derived (e.g., by a DDN system 140) by translating behavioral classification model 370 into those other policies, which may be used to detect abnormal behavior.

As an example, consider a scenario in which model 370 records the transmission of PHI outside system 100 as baseline behavior. A data usage policy may be defined (e.g., by a user) that prevents such an operation from occurring. In this manner, a data usage policy 350 may take an initial set of baseline behaviors from model 370 and produce a final set of baseline behaviors (which may of course be further altered as desired). Note that in some embodiments, the set of baseline behaviors as modified by data usage policies 350 may all have an implicit action—for example, all baseline behaviors are permitted, and any non-baseline behavior is not permitted. In other embodiments, additional information may be associated with the set of baseline behaviors that specifies a particular action to be performed in response to a particular behavior.

As will be discussed below, because DDN system 140 collects the contents and behavioral features 345 of data objects 335, DDN system 140 may provide users with an understanding of how data is being used along with other insightful information (e.g., the relationships between data objects 335). A user may realize that certain data is being used in a manner that is not desirable to the user based on the baseline behavior exposed to the user by DDN system 140. For example, a user may become aware that banking data is accessed by applications that should not have access to it. Accordingly, a user may provide a data usage policy 350 that curtails the baseline behavior by preventing particular aspects of that behavior such as not allowing the banking data to be accessed by those applications that should not have access to it.

A DDN data structure 225, in various embodiments, is built by a DDN system 140 to contain a content class 330, behavioral classes 340, and data usage policies 350 that allow data to be managed in an effective manner. A DDN data structure 225 may be metadata that is maintained by a DDN system 140. It is noted that a DDN data structure 225 is intended to not have any dependency on the underlying physical infrastructure built to store, transport or access data. Rather, it presents a logical view of all the data and their features for the same content class 330. Examples of behavioral features 345 will now be discussed.

Figure 4:
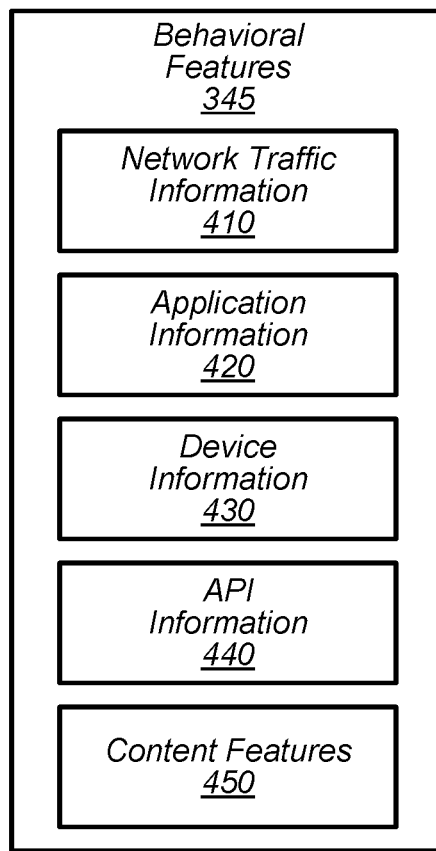
FIG. 4 is a block diagram illustrating example behavioral features, according to some embodiments

Turning now to FIG. 4, a block diagram of example behavioral features 345 that might be collected for data objects 335 are shown. In the illustrated embodiment, behavioral features 345 include network traffic information 410, application information 420, device information 430, API information 440, and content features 450. In some embodiments, other types of behavioral features may be collected in addition to the behavioral features 345 discussed below. All of these types of behavioral features need not be collected in all embodiments.

As explained earlier, a piecewise hashing algorithm and/or content classification model 360 may be used to identify data objects 335 (e.g., files) for further analysis. Once a data object 335 matches a root hash value 337 of, e.g., a data sample 305 or corresponds to a content class 330, then that data object 335 itself (its contents) may be collected and then used for training content classification model 360. But in addition to collecting the content of a data object 335, behavioral features 345 related to that data object 335 may further be collected to help inform the expected behavior of that data object 335. Any combination of the behavioral features 345 discussed below along with other features may be collected and stored with the content of a data object 335 for subsequent training of behavioral classification models 370.

Network traffic information 410, in various embodiments, includes information about the transmission of a data object 335. When a data object 335 is extracted from intra-network traffic 115, that data object 335 is nearly always in transit from some origin to some destination, either of which may or may not be within the boundary of system 100. As such, the origin and destination of a data object 335 in transit may be collected as part of network traffic information 410. Different protocols and applications may have different ways to define the origin and the destination and thus the information that is collected may vary. Examples of information that may be used to define the origin or the destination may include internet protocol (IP) addresses or other equivalent addressing schemes.

Information identifying any combination of the various open system interconnect (OSI) layer protocols associated with the transmission of a data object 335 may be collected as part of network traffic information 410. As an example, whether a data object 335 is sent using the transmission control protocol (TCP) or the user datagram protocol (UDP) in the transport layer of the OSI model may be collected.

Application information 420, in various embodiments, includes information about the particular application receiving and/or sending a data object 335. For example, the information may include the name of an application and the type of the application. Moreover, a data object 335 may be routinely accessed by a certain group of applications that may share configuration parameters. Such parameters may be reflected in, for example, command-lines options and/or other application or protocol-related metadata that is conveyed along with a data object 335 in traffic 115. These parameters may be collected to the extent that they can be identified.

An application associated with a data object 335 may be associated with a current data session that may be related to other network connections. When there are related sessions, the behavioral features 345 from the related sessions may further be collected, as they may inform the behavior of that data object. Within a given data session, there may be many queries and responses for access to a certain data object 335. The frequency of access of that certain data object 335 over time may be collected as part of application information 420. Related to access frequency, the volume of data throughput may also be collected since, for example, an anomaly in the volume of data transfer may be indicative of a data breach.

Device information 430, in various embodiments, includes information about the agent or device requesting a data object 335. Examples of such information may include whether the device is a server or a client system, its hardware and/or operating system configurations, and any other available system-specific information. In some instances, the particular data storage being accessed to transfer a data object 335 may present a known level of risk (e.g., as being accessible by a command and control server, and thus more vulnerable than storage accessible by a less privileged system, etc.). Accordingly, information regarding the level of security risk associated with data storage may be collected as part of device information 430.

API information 440, in various embodiments, includes information about application programming interfaces (API) that are used to access a data object 335. As an example, a data object 335 may be accessed using the hypertext transfer protocol (HTTP) GET command, the file transfer protocol (FTP) GET command, or the server message block (SMB) read command and thus such information may be collected as part of API information 440. An anomaly in the particular API calls or their sequence can be an indicator of a data breach. Accordingly, API sequence information may be collected as a behavioral feature 345.

Content features 450 may include information that identifies properties of the content of a data object 335. For example, for a WORD document, content features 450 may identify the length of the document (e.g., the number of words in the document), the key words used in the document, the language in which the document is written (e.g., English), the layout of the document (e.g., introduction→body→conclusion), etc. Content features 450 may also identify the type of a data object 335 (e.g., PDF, MP4, etc.), the size of a data object 335 (e.g., the size in bytes), whether a data object 335 is in an encrypted format, etc. Content features 450, in various embodiments, are used to detect abnormal behavior. For example, if a data object 335 is normally in an unencrypted format, then obtaining a content feature 450 that indicates that the data object 335 is in an encrypted format may be an indication of abnormal behavior. In some embodiments, content features 450 may be used to train a content classification model 360 and to determine to which content class 330 that a data object 335 belongs. Accordingly, content features 450 may, in some cases, be collected before other behavioral features 345.

It is noted that not all of the aforementioned features 345 are necessarily used together in each embodiment. In some embodiments, the particular features 345 that are collected may be dynamically altered during system operation, e.g., by removing some features and/or adding others. The particulars of one embodiment of DDN manager 230 will now be discussed with respect to FIG. 5.

Figure 5:
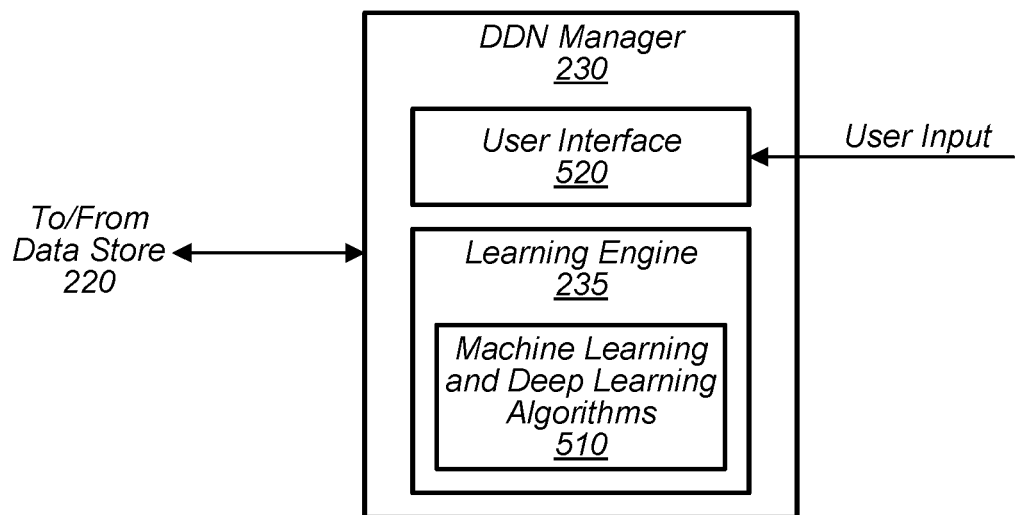
FIG. 5 is a block diagram illustrating example elements of a DDN manager, according to some embodiments.

Turning now to FIG. 5, a block diagram of an example DDN manager 230 is shown. In the illustrated embodiment, DDN manager 230 includes a learning engine 235 (having machine learning and deep learning algorithms 510) and a user interface 520. In some embodiments, a DDN manager 230 may be implemented differently than shown—e.g., user interface 520 may be separate from DDN manager 230.

As explained earlier, to collect data for machine learning training purposes, a piecewise hashing algorithm may initially be used to discover, based on evaluating intra-network traffic 115, data objects 335 with content similar to provided data samples 305. Under this approach, the assumption is that data objects 335 sharing enough content similarity should be in the same content class 330. The piecewise hashing algorithm may be further assisted, however, by using machine learning content classification methods to help identify more data objects 335 that are similar to provided data samples 305. As an example, machine learning content classification may facilitate similarity detection in cases that are difficult for the piecewise hashing algorithm to handle such as content that is contextually the same, but is ordered in a reasonably different manner than the provided data samples 305. It is noted, however, that in various embodiments, machine learning content classification may be omitted (e.g., in the cases where the piecewise hashing algorithm provides sufficient coverage and accuracy).

Learning engine 235, in various embodiments, trains content classification models 360 using machine learning and deep learning algorithms 510. For example, learning engine 235, in some embodiments, uses algorithms 510 such as support vector machine (SVM) algorithms and convolutional neural network (CNN) algorithms to train content classification models 360 such as a set of SVM models in conjunction with a set of CNN models, although many other architectures that use different algorithms 510 are possible and contemplated. Root hash values 337 (discussed above) may serve as labels for the content classes 330 that result from content classification models 360.

In some embodiments, learning engine 235 uses machine learning and deep learning algorithms 510 to identify specific types of data objects 335 and to generate pattern matching rules (e.g., regex expressions) or models that may be used on a specific type of data object 335 to identify whether that data object 335 includes data of interest. More specifically, discovering information of interest (e.g., PHI) in different types of unstructured data (e.g., PDFs, pictures, etc.) may be challenging for, e.g., a piecewise hashing algorithm. Accordingly, learning engine 235 may train a set of natural language processing (NLP) content classification models (which are examples of content classification models 360) to classify a data object 335 to determine if that data object 335 is part of a content class 330. If that data object 335 belongs to a content class 330 within DDN system 140, then pattern matching rules (which may be generated using algorithms 510) may be used on that data object 335 to extract any information of interest. For example, content classification models 360 may classify a credit card PDF form as belonging to a PII content class 330 and thus regular expressions (which may be selected specific to PDFs) may be used to identify whatever PII is in that credit card PDF form.

Learning engine 235, in various embodiments, further trains behavioral classification models 370 using machine learning and deep learning algorithms 510. For example, learning engine 235, in some embodiments, uses algorithms 510 such as convolutional neural network (CNN) algorithms and recurrent neural networks (RNN) algorithms to train behavioral classification model 370 such as a set of CCN models in conjunction with a set of RNN models, although many other architectures that use different algorithms 510 are possible and contemplated. In some cases, RNN models may be used for tracking time series behavior (e.g., temporal sequences of events) while CNN models may be used for classifying behavior that is not time-dependent. Behavioral class 340, in some embodiments, are labeled with a unique identifier and associated with a content class 330. Accordingly, a single content class 330 may be associated with a set of behavioral classes 340. Together, a content class 330 and behavioral classes 340 may define the behavioral benchmark of a data object 335 (i.e., the baseline behavior, which may be based on the observed behavior of that data object 335 within intra-network traffic 115). In some embodiments, data usage policies 350 may be derived based on the observed baseline behavior of a given data object 335 and stored in the appropriate DDN data structure 225.

Thus, the collected content and behavioral features 345 may be used by learning engine 235 for training content classification models 360 and behavioral classification models 370 to perform content and behavioral classification, respectively. The process of classification may result in classes, such as content classes 330 and behavioral classes 340. It is noted, however, that although machine learning classification techniques may be used to generate classes, any suitable classification technique may be employed.

When machine learning classification training is complete, in various embodiments, the resulting models 227 may be deployed for real-time enforcement, either in the network device that completed the learning phase, or in other devices within the network. As an example, models 227 may be packed into Python objects and pushed to data manager 210 that can perform real-time enforcement (e.g., which, as discussed earlier, may be situated within a network appliance 120 in such a manner that it may intercept anomalous traffic and preventing it from being further transmitted within the network of system 100). In order to support real-time enforcement, in various embodiments, DDN data structures 225 (or a portion thereof such as data usage policies 350) are provided to data manager 210.

User interface 520, in various embodiments, provides information maintained by DDN system 140 to users for better understanding their data. That information may include the data objects 335, content classes 330, behavioral features 345, behavioral classes 340, and policies 350 of DDN data structures 225 maintained at data store 220 in addition to models 227. Thus, interface 520, in various embodiments, issues different query commands to the data stores 220 to collect information and present DDN data structure 225 details to users. DDN data structure 225 information may be presented to users in a variety of ways.

User interface 520 may provide users with access and history information (e.g., users, their roles, their location, the infrastructure used, the actions performed, etc.). This information may be presented in, e.g., tables, graphs, or maps, and may indicate whether an access involves one DDN data structure 225 or multiple difference DDN data structures 225. This information may, in various cases, be based on collected behavioral features 345.

User interface 520 may provide users with content information that presents a measure of distance (or similarity) between different data objects 335. For example, two different data objects 335 may have a certain level of content similarity (e.g., 80% similar), but have different behavioral features 345. By viewing content information in this manner, users may be enabled to evaluate related DDN data structures 225 and modify data usage patterns. For example, if two data objects 335 are quite similar in content but have divergent behaviors, administrators may intervene to change the data access structure (e.g., by changing rules or policies 350) to bring those data objects into better conformance, which may help improve performance and/or security, for example.

User interface 520 may provide users with data dependency information that presents the data dependencies among various objects (e.g., in order to display a web page, the database record x in table z needs to be accessed). This dependency information may span across DDN data structures 225, creating a content dependency relationship between them. If an anomaly is detected with respect to one DDN data structure 225, dependency information may facilitate determination of the potential scope of that anomaly. For example, if the data objects 335 that are associated with a DDN data structure 225 are to be isolated after detection of an anomaly, then dependency information may facilitate determining how widespread the impact of such isolation might be. The dependency information may be part of the behavioral information that is collected for a data object 335. For example, a data object 335 may be observed on multiple occasions to be in transit with another object 335 or may be observed in response to particular requests that are extracted from network traffic. Accordingly, the behavior of that data object 335 may indicate that it depends on that other data object 335 or that the object depends on it. Also, when investigating an actual attack or malicious event, considering the lateral impact may be more comprehensively performed from a content or even application dependency level than from just the network level. This information may also be extended to include application dependencies (e.g., application A uses data C that has a content dependency on data D that is also created/managed by application B).

User interface 520 may provide users with security information, such as information regarding security best practices for certain types of data and the status of security compliance of various data objects 335. User interface 520 may also provide users with user-defined rule information. As noted elsewhere, users may provide their own policies 350 used for similarity detection, content classification, behavioral classification, and enforcement. Accordingly, user interface 520 may enable users to view, change, and create rules Thus, user interface 520 may provide users with a better understanding of their data, and based on that understanding, allow them to improve their data protection and optimize data usage. Particularly, it may help users to construct a data usage flow across different DDN data structures 225, and map these into user-defined business intents—enabling a user to evaluate how data is being used at various steps of the flow, and whether those steps present security risks. An example learning workflow will now be discussed.

Figure 6:
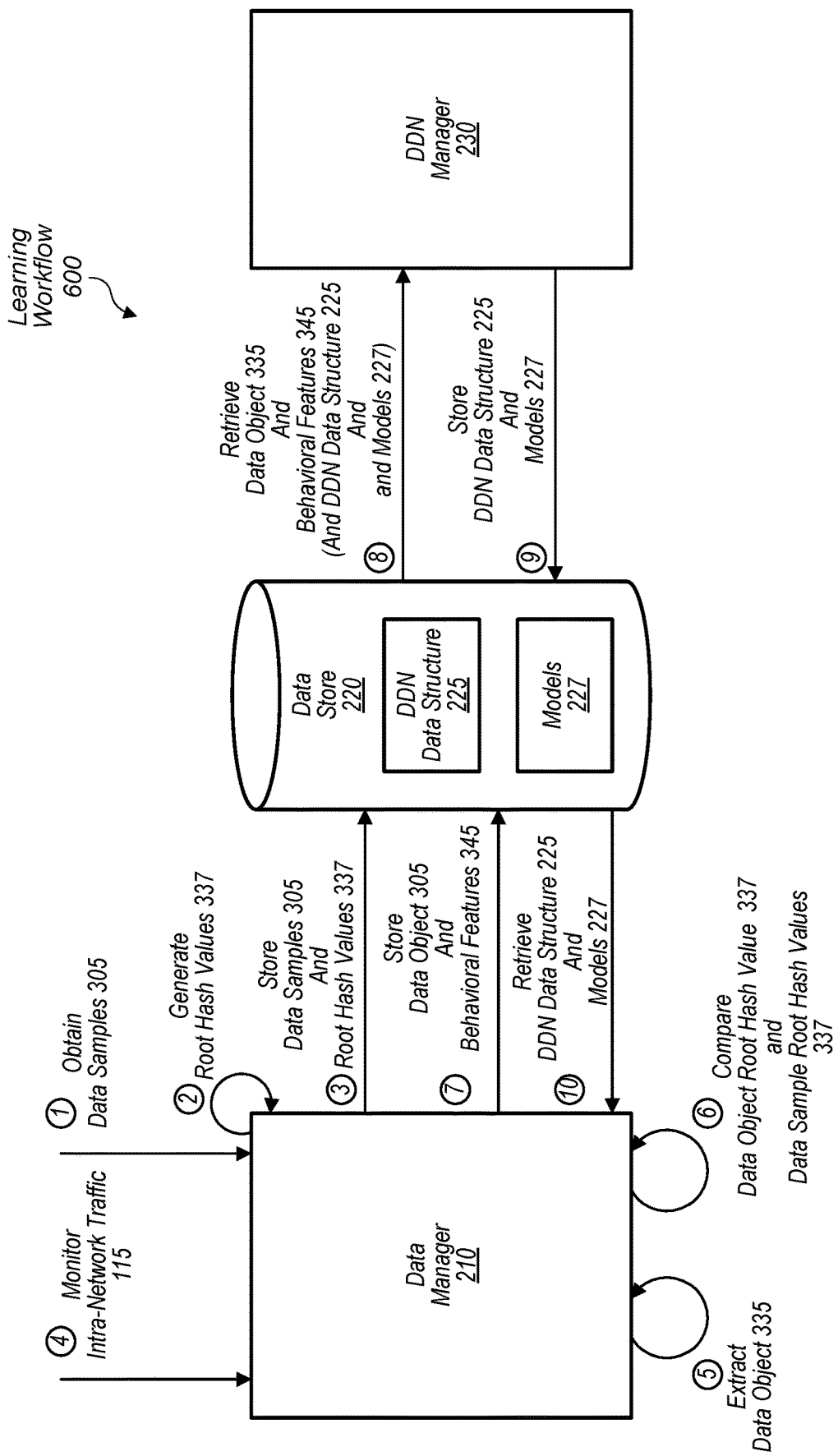
FIG. 6 is a block diagram illustrating example elements of a learning workflow, according to some embodiments.

Turning now to FIG. 6, a block diagram of an example learning workflow 600 is shown. In the illustrated embodiment, learning workflow 600 involves a data manager 210, a data store 220, and a DDN data structure 225. As shown, the illustrated embodiment includes numerical markers indicating one possible ordering of the steps of learning workflow 600.

As illustrated, data samples 305, in various embodiments, are initially provided to data manager 210 (e.g., by a user of DDN system 140). Those data samples 305 may be copied to a local or external storage that is accessible to data manager 210 or may be directly uploaded to data manager 210. Once data samples 305 have been obtained, in various embodiments, data manger 210 uses a piecewise hashing algorithm (as explained earlier) to generate a root hash value 337 for each of the provided data samples 305, and then stores those root hash values 337 along with those data samples in data store 220.

Thereafter, data manager 210 may begin monitoring intra-network traffic 115 and may extract a data object 335 from that traffic. Accordingly, in various embodiments, data manager 210 normalizes that data object 335, generates a root hash value 337 for it, and compares the generated root hash value 337 with the root hash values 337 associated with the provided data samples 305. If the generated root hash value 337 meets some specified matching criteria (e.g., 80% correspondence) for a root hash value 337 of a data sample 305, then data manager 210 may store the corresponding data object 335 and its behavioral features 345 in association with the same set as the matching data sample 305. In some instances, that data object 335 and its behavioral features 345 may be labeled with the root hash value 337 of the relevant data sample 305.

The data object 335 and its behavioral features 345, in various embodiments, are passed through DDN manager 230 in order to create a DDN data structure 225 and thus, to create the initial baseline behavior for that data object 335. If a DDN data structure 225 already exists for the group corresponding to that data object 335, then the DDN data structure 225 and models 227 may also be retrieved and trained using that data object 335 and its behavioral features 345. In various embodiments, once a DDN data structure 225 and models 227 are created or updated, DDN manager 230 stores them in data store 220. Thereafter, data manager 210 may retrieve the DDN structure 225 and models 227 to be used for future learning or enforcement. As discussed, the initial baseline behavior set for a data object may be modified by data usage policies 350 received from a user in order to create an updated baseline behavior set.

Accordingly, once sufficient information has been collected during the learning phase, the enforcement may be enabled. (In some embodiments, the learning phase may continue to operate during enforcement, enabling enforcement to dynamically adapt to data behavior over time.)

As shown in FIG. 1, system 100 may include multiple DDN systems 140, each of which may implement the learning phase as discussed above. In some cases, the information obtained by one DDN system 140 during its learning phase may be passed to another DDN system 140 for use. As an example, a DDN data structure 225 generated by one DDN system 140 may be provided to another DDN system 140 to be used during its enforcement phase. In this manner, the learning performed by one DDN system 140 augment the learning of another DDN system 140. Moreover, the learning phases between DDN systems 140 may be different. For example, one DDN system 140 may receive a data usage policy 350 that is different than one received by another DDN system 140. Particular embodiments of the enforcement phase based on data created and modified in the learning phase will be discussed next.

Figure 7:
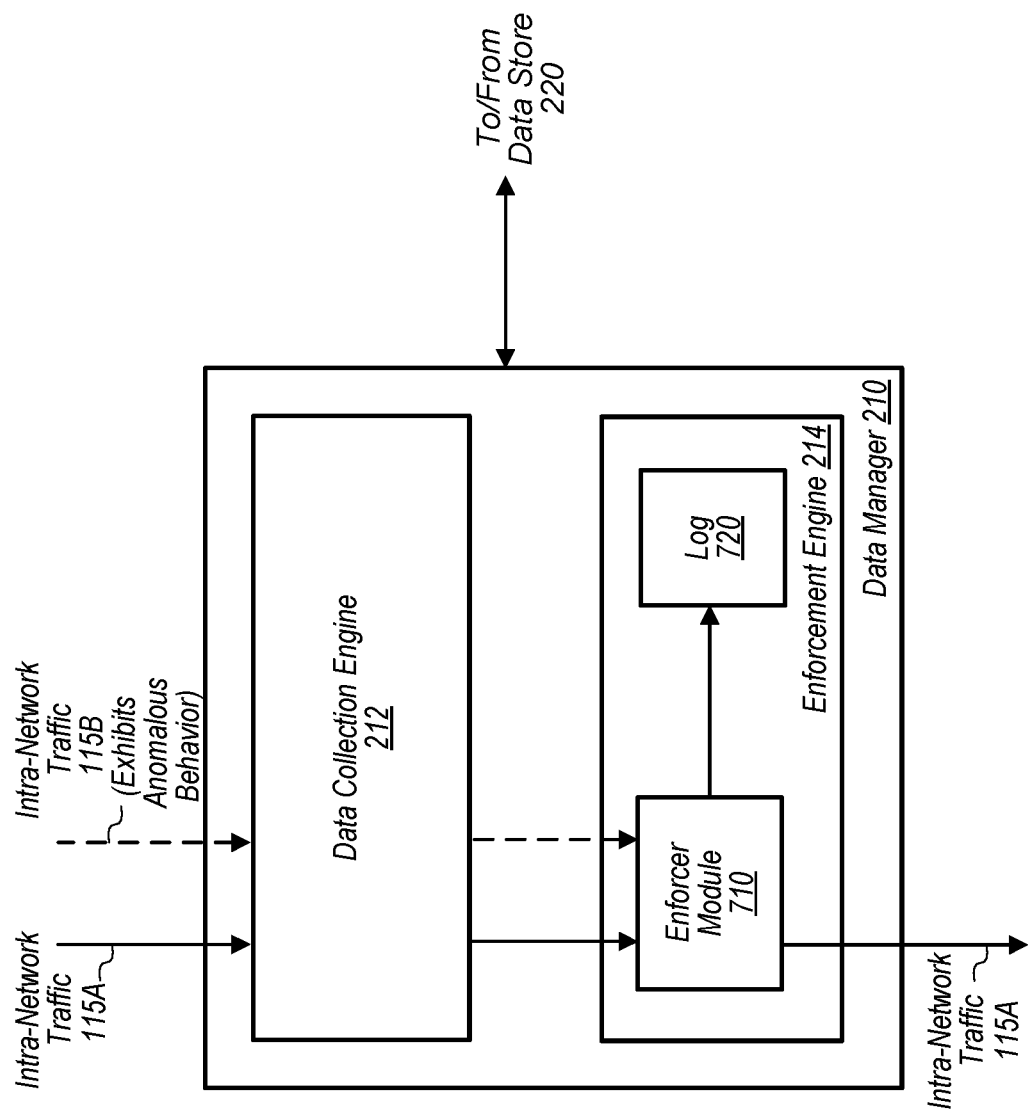
FIG. 7 is a block diagram illustrating example elements of an enforcement engine, according to some embodiments.

Turning now to FIG. 7, a block diagram of an example data manager 210 implementing an enforcement phase is shown. In the illustrated embodiment, data manager 210 includes data collection engine 212 and enforcement engine 214. As further shown, enforcement engine 214 includes an enforcer module 710 and a log 720. For illustrative purposes, two different types of intra-network traffic are depicted: intra-network traffic 115A that is normal (i.e., expected or permissible) and intra-network traffic 115B that exhibits anomalous or unwanted behavior. In some embodiments, data manager 210 may be implemented differently than shown—e.g., enforcement engine 214 may not include log 720.

Similar to the learning phase, in various embodiments, the enforcement phase involves collecting content and behavioral features 345 from the data objects 335 that are extracted from intra-network traffic 115. Accordingly, as shown, intra-network traffic 115 may pass through data collection engine 212 so that content and behavioral features 345 can be collected before that traffic passes through enforcement engine 214. The content and/or behavioral features 345 that are collected may be provided to enforcer module 710 for further analysis. In some embodiments, behavioral features 345 collected for enforcement may be the same as those features collected for the learning phase, although in other embodiments the features may differ.

Enforcer module 710, in various embodiments, monitors and controls the flow of intra-network traffic 115 (e.g., by permitting data objects 335 to pass or dropping them) based on data usage policies 350. Accordingly, enforcer module 710 may obtain DDN data structures 225 and models 227 from data store 220 and use them to control traffic flow. In various embodiments, content and behavioral features 345 are classified using models 227 that were trained in the learning phase into a content class 330 and a behavioral class 340, respectively, in order to determine whether the corresponding data object 335 is associated with normal or anomalous behavior. Enforcer module 710 may first classify a data object 335, based on its content, into a content class 330 in order to determine whether that data object 335 belongs to a particular DDN data structure 225. If a data object 335 falls into a content class 330 that is not associated with any DDN data structure 225, then it may be assumed that the data object 335 does not include content that is of interest to the users of DDN system 140 and thus the data object 335 may be allowed to be transmitted its destination, but may also be logged in log 720 for analytical purposes. But if a data object 335 falls into a content class 330 that is associated with a certain DDN data structure 225, then its behavioral features 345 may be classified. As such, behavioral classification in some embodiments may be performed only on data objects 335 identified during content classification. In other embodiments, however, it is contemplated that content and behavioral classification may occur concurrently. Moreover, in yet some embodiments, enforcement decisions may be made solely on the basis of behavioral classification.

Behavioral features 345, in various embodiments, are classified by using the behavioral classification model 370, which may then produce a behavioral classification output, e.g., in the form of a list of behavior class scores. If the classification of the behavioral features 345 of the data object 335 falls into a behavioral class 340 of the corresponding DDN data structure 225, then the behavior of that data object 335 may be deemed normal and the data object 335 may be allowed to pass, but a record may be stored in log 720. If, however, the classification does not fall into any behavioral classes 340 of the corresponding DDN data structure 225 (i.e., the DDN data structure 225 that the data object 335 belongs to by virtue of its content being classified into the content class 330 of that DDN data structure 225), then the behavior of the data object 335 may be deemed anomalous and a corrective action may be taken. In various embodiments, a data object 335 exhibiting anomalous behavior is dropped from intra-network traffic 115 (as illustrated by intra-network traffic 115B not passing beyond enforcer module 710) and a record is committed to log 720. Log 720, in various embodiments, records activity pertaining to whether data objects 335 are allowed to pass or dropped from traffic and can be reviewed by users of DDN system 140.

Data usage policies 350, in various embodiments, may permit the behavior of a data object 335 to be narrowed or broadened. For example, even if a data object is not indicated to be anomalous based on the content and/or behavioral classifications, it may fail to satisfy one or more data usage policies 350, and may consequently be identified as anomalous. Such a data object 335 may be handled in the same manner as data objects 335 that otherwise fail the machine learning classification process, or it may be handled in a user-defined fashion. For example, if a data object 335 has been regularly used by a group of users and an administrator learns of this behavior via DDN system 140 and updates a policy 350 preventing that group of users from using that data object 335, then when that data object 335 is classified by enforcer module 710, it will still appear to be behaving normally. Enforcer module 710, however, may drop the data object 335 from intra-network traffic 115 because of a policy 350 (and/or a policy derived by a DDN system 140 based on behavioral features 345).

Thus, in various embodiments, using content and behavioral classification results along with policies 350, enforcer module 710 can verify if a data object 335 has the desired behavior and/or content. If the results of classification or policies 350 indicate that the data object is anomalous (either with respect to its content or its behavior, or both) further transmission of the data object will be prevented (e.g., by discarding or otherwise interdicting the traffic associated with that data object 335).

In some embodiments, in order to enable consistent data management at different areas of system 100, the data (e.g., DDN data structure 225 and models 227) maintained at data store 220 may be spread around to different components of system 100 (e.g., copies may be sent to each DDN system 140 in system 100). Accordingly, enforcers 710 at different areas in system 100 may each monitor and control intra-network traffic 115 using the same DDN information; however, in some cases, each DDN system 140 may maintain variations of that information or its own DDN information. As an example, a DDN system 140 that receives traffic from a data store 111 that stores PHI and PII may monitor that traffic for those types of information while another DDN system 140 in the same system 100 that receives traffic from another data store 111 that stores PII and confidential information may monitor that traffic for those types. These DDN systems 140, however, may in some cases share DDN information relevant to controlling PII since they both monitor and control that type of information.

In various embodiments, data-based micro-segmentation may be used in which logical perimeters are built around data of interest to protect that data in many cases. These perimeters allow for policies to be employed against that data. Enforcer modules 710 may, in some cases, be deployed at locations near data of interest and ensure that anomalous use of that data (e.g., the data is not being used in accordance with a particular policy 350 and/or a policy that may be derived from behavioral classification model 370) is prevented. For example, a user may wish to protect Social Security numbers. Accordingly, using DDN data structures 225 and enforcer modules 710, a logical, protective perimeter may be established around areas where Social Security numbers are stored, despite those numbers possibly being stored within different data stores that are remote to each other. The user may define a set of policies 350 that are distributed to the enforcer modules 710 for preventing behavior that is not desired by the user. In various embodiments, DDN information (e.g., DDN data structures 225) may be shared between enforcer modules 710 that are protecting the same data of interest. An example enforcement workflow will now be discussed.

Turning now to FIG. 8, a block diagram of an example enforcement workflow 800 is shown. In the illustrated embodiment, enforcement workflow 800 involves a data manager 210 and a data store 220. As shown, the illustrated embodiment includes numerical markers that indicate one possible ordering of the steps of enforcement workflow 800.

As illustrated, data manager 210, in various embodiments, initially retrieves DDN data structures 225 and models 227 from data store 220. Thereafter, data manager 210 may monitor intra-network traffic 115 and may extract a data object 335 from that traffic 115. As such, data manager 210, in some embodiments, classifies that data object 335 using content classification model 360 into a content class 330. That content class 330 may then be used determine if the data object 335 falls into a content class 330 associated with a DDN data structure 225. If not, then that data object 335 may be allowed to reach its destination; otherwise, data manager 210, in some embodiments, classifies that data object 335 using behavioral classification model 370 into a behavioral class 340. That behavioral class 340 may then be used to determine if the data object 335 falls into a behavioral class 340 that is corresponds to the content class 330 in which the data object 335 has been classified. If it does, then one or more policies 350 may be applied to that data object 335 and if it satisfies those policies, then it may be allowed to pass. But if the data object's behavioral class 340 does not match behavioral class 340 in the corresponding DDN data structure 225, then, in various embodiments, it is prevented from passing (e.g., it is dropped from intra-network traffic 115) and the incident is recorded in log 720.

Similar to the learning phase, information gathered during the enforcement phase may be shared between DDN systems 140. In various instances, a particular DDN system 140 may be responsible for monitoring and controlling a particular type of data (e.g., PHI) while another DDN system 140 may be responsible for monitoring and controlling a different type of data (e.g., PII). Moreover, in some embodiments, a system 100 may employ DDN systems 140 that implement different roles (e.g., one may implement the learning phase while another may only implement the enforcement phase). As such, those DDN system 140 may communicate data between each other to help each other implement their own respective roles.

Figure 9:
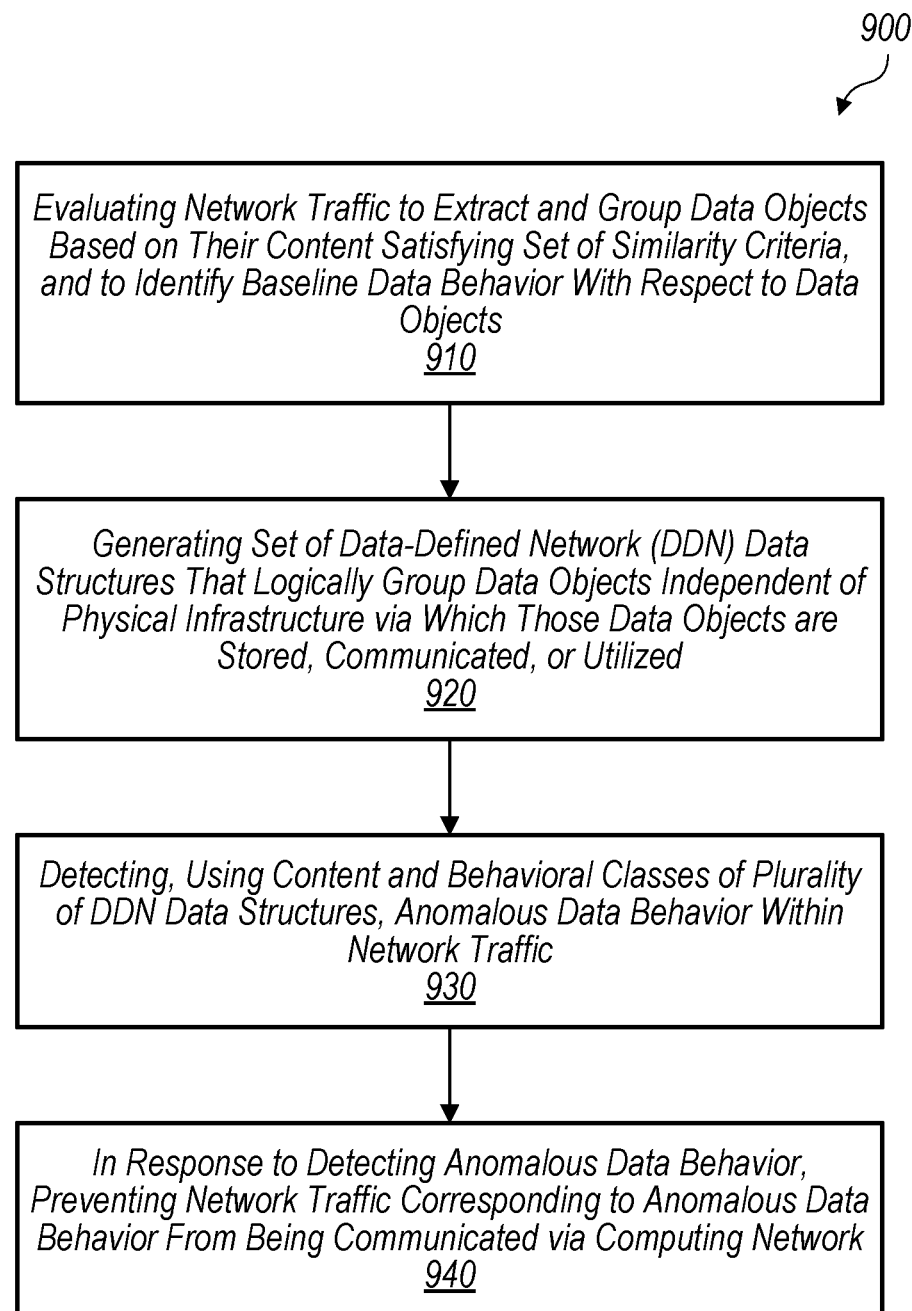
FIGS. 9-11 are flow diagrams illustrating example methods relating to managing data, according to some embodiments.

Turning now to FIG. 9, a flow diagram of a method 900 is shown. Method 900 is one embodiment of a method performed by a computer system (e.g., DDN system 140) to control data within a computing network (e.g., network of system 100). In some embodiments, method 900 may include additional steps—e.g., the computer system may present a user interface (e.g., user interface 520) to a user for configuring different aspects (e.g., data usage policies 350) of the computer system.

Method 900 begins in step 910 with the computer system evaluating network traffic (e.g., intra-network traffic 115) to extract and group data objects (e.g., data objects 335) based on their content satisfying a set of similarity criteria, and to identify baseline data behavior with respect to the data objects. In some embodiments, the computer system receives one or more user-provided data samples (e.g., data samples 305), generates respective root hash values (e.g., root hash values 337) corresponding to the one or more user-provided data samples, and then stores the root hash values in a database (e.g., data store 220). Accordingly, the computer system may determine that the content of a given one of the data objects satisfies the set of similarity criteria by generating a data object hash value of the given data object and then by determining that the data object hash value matches a given one of the root hash values stored in the database. In some embodiments, subsequent to determining that a given one of the one or more data objects satisfies the set of similarity criteria, the computer system stores a record of behavioral features (e.g., behavioral features 345) associated with the given data object.

In step 920, the computer system generates a set of data-defined network (DDN) data structures (e.g., DDN library 222 of DDN data structures 225) that logically group data objects independent of physical infrastructure via which those data objects are stored, communicated, or utilized. A given one of the set of DDN data structures may include a content class (e.g., content class 330) and one or more behavioral classes (e.g., behavioral classes 340). The content class may be indicative of one or more of the data objects that have been grouped based on the one or more data objects satisfying the set of similarity criteria and the one or more behavioral classes may indicate baseline network behavior of the one or more data objects within the content class as determined from evaluation of the network traffic. In some embodiments, the content class of a given DDN data structure may be based upon a machine learning content classification of content of a given data object. In some embodiments, the one or more behavioral classes of the given DDN data structure may be based upon a machine learning behavioral classification the record of behavioral features associated with the given data object. The machine learning behavioral classification may involve training a set of convolutional neural networks (CNN) and recurrent neural networks (RNN) using the record of behavioral features associated with the given data object. In some cases, other networks may be used instead of CNN and RNN, such as long short-term memory (LSTM) networks.

In step 930, the computer system detects anomalous data behavior within network traffic based on the content classes and the behavioral classes of the generated set of DDN data structures. In some embodiments, the computer system may detect anomalous data behavior by identifying an extracted data object from the network traffic and evaluating the extracted data object with respect to the content class and the one or more behavioral classes of ones of the DDN data structures. Such an evaluation may include determining, based upon the machine learning behavioral classification, that the extracted data object does not exhibits expected behavior and then indicating that the extracted data object exhibits anomalous behavior based upon the extracted data object failing to exhibit the expected behavior.

In step 940, in response to detecting the anomalous data behavior, the computer system prevents network traffic corresponding to the anomalous data behavior from being communicated via the computing network.

Figure 10:
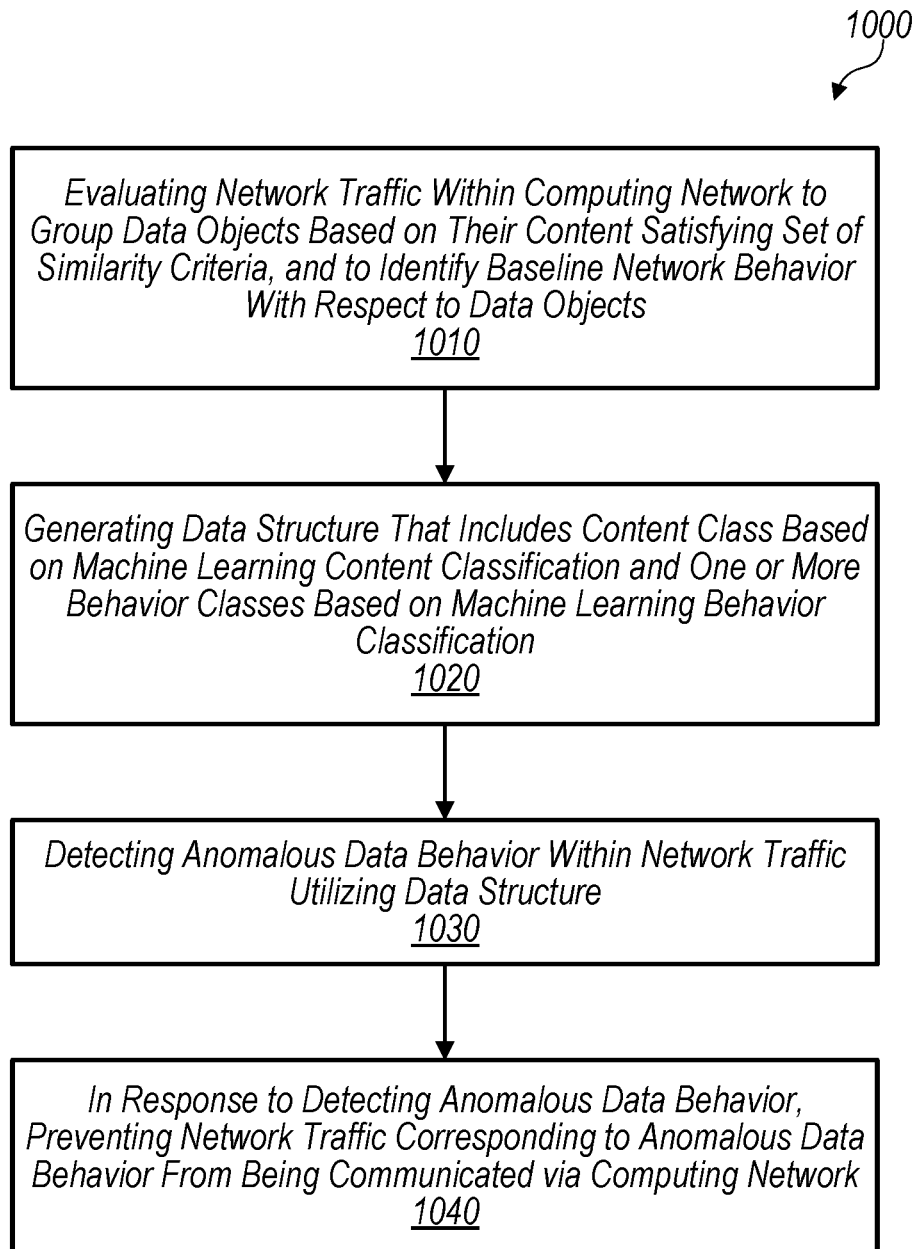

Turning now to FIG. 10, a flow diagram of a method 1000 is shown. Method 1000 is one embodiment of a method performed by a computer system (e.g., DDN system 140) to manage data. Method 1000 may, in some instances, be performed by executing a set of program instructions stored on a non-transitory computer-readable medium. In some embodiments, method 1000 may include additional steps— e.g., the computer system may present a user interface (e.g., user interface 520) to a user for configuring different aspects (e.g., data usage policies 350) of the computer system.

Method 1000 begins in step 1010 with the computer system evaluating network traffic (e.g., intra-network traffic 115) within a computing network (e.g., a network across multiple systems 100) to group data objects (e.g., data objects 335) based on their content satisfying a set of similarity criteria, and to identify baseline network behavior with respect to the data objects. In some embodiments, the computer system retrieves a plurality of data samples (e.g., data samples 305) from one or more storage devices, generates a respective plurality of root hash values (e.g., root hash values 337) using the plurality of data samples; and then stores the plurality of root hash values within a database (e.g., data store 220). Accordingly, determining that content of a given one of the data objects satisfies the set of similarity criteria may include generating a data object hash value for the given data object and then determining that the data object hash value matches a given one of the root hash values stored in the database.

In step 1020, the computer system generates a data structure (e.g., DDN data structure 225) that includes a content class (e.g., content class 330) based on machine learning content classification and one or more behavioral classes (e.g., behavioral classes 340) based on machine learning behavioral classification. The content class may be indicative of one or more of the data objects that have been grouped based on the one or more data objects having a set of similar content and the one or more behavioral classes may be indicative of baseline network behavior of the one or more data objects within the content class as determined from evaluation of the network traffic.

In step 1030, the computer system detects anomalous data behavior within network traffic utilizing the data structure. Detecting anomalous data behavior may include identifying an extracted data object from the network traffic and evaluating the extracted data object with respect to the content class and the one or more behavioral classes of the data structure. In some cases, evaluating the extracted data object with respect to the content class and the one or more behavioral classes of the data structure may further comprise: determining, based upon the machine learning behavioral classification, that the extracted data object does not exhibits expected behavior; and indicating that the extracted data object exhibits anomalous behavior based upon the extracted data object failing to exhibit the expected behavior. In some instances, the computer system may obtain one or more data usage rules (e.g., data usage policies 350) regarding content or behavior of data objects and may store the one or more data usage rules in association with the data structure. Accordingly, evaluating the extracted data object with respect to the content class and the one or more behavioral classes of the data structure may further comprise: determining, based upon the machine learning behavioral classification, that the extracted data object exhibits expected behavior; and in response to determining that the extracted data exhibits expected behavior, determining that the extracted data object fails to satisfy the one or more data usage rules included in the data structure; and indicating that the extracted data object exhibits anomalous behavior based upon the extracted data object failing to satisfy the one or more of the data usage rules.

In step 1040, in response to detecting the anomalous data behavior, the computer system prevents the network traffic corresponding to the anomalous data behavior from being communicated via the computing network.

Figure 11:
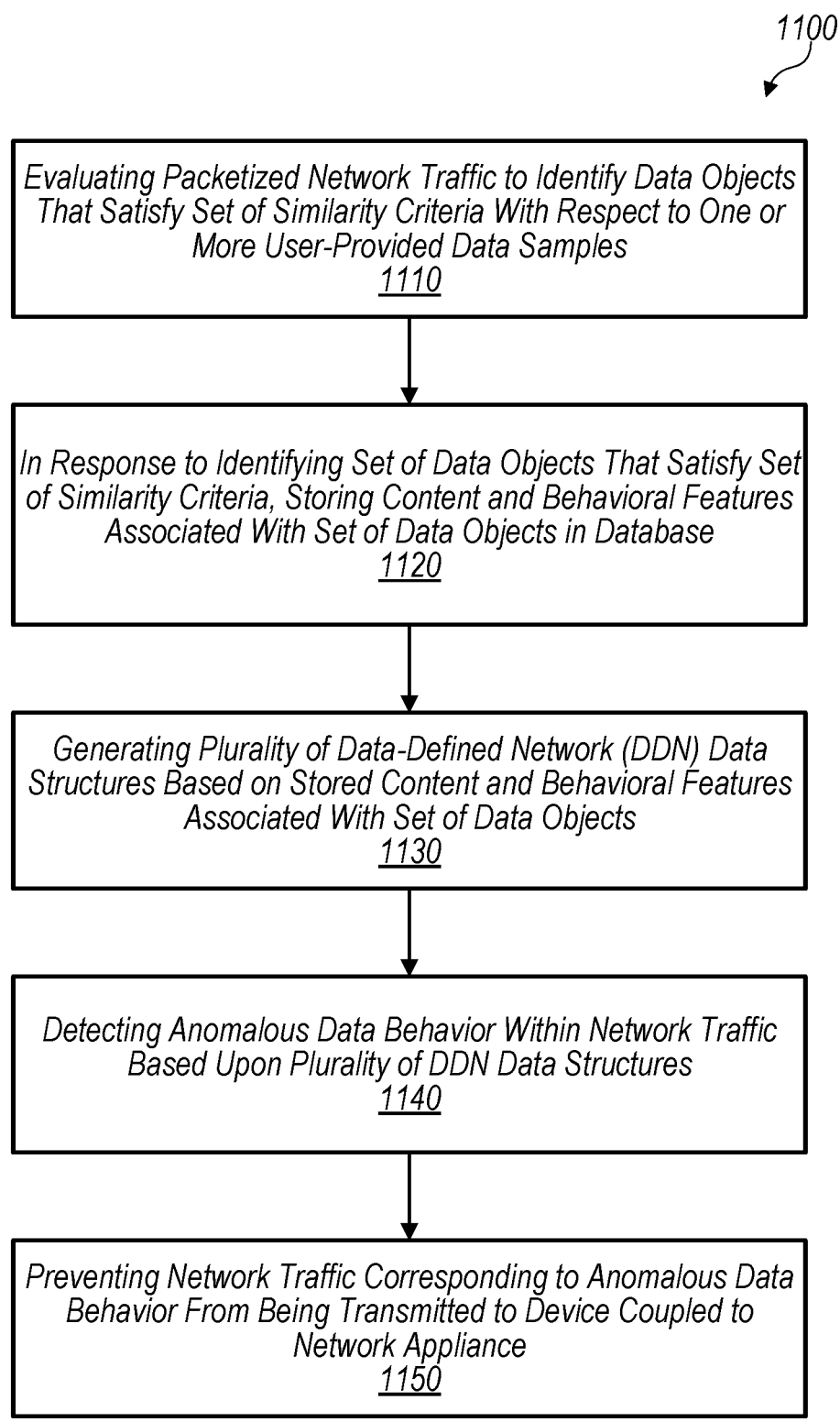

Turning now to FIG. 11, a flow diagram of a method 1100 is shown. Method 1100 is one embodiment of a method performed by a computer system (e.g., a network appliance 120) to manage data. The computer system may include a plurality of network ports configured to communicate packetized network traffic, one or more processors configured to route the packetized network traffic among the plurality of network ports; and a memory that stores program instructions executable by the one or more processors to perform method 1100. The computer system may be a network switch or a network router. In some embodiments, method 1100 includes additional steps such as implementing a firewall (e.g., firewall 130) that prevents network traffic from being transmitted to a device coupled to the network appliance based on that network traffic failing to satisfy one or more port-based rules.

Method 1100 begins in step 1110 with the computer system evaluating packetized network traffic (e.g., intra-network traffic 115) to identify data objects (e.g., data objects 335) that satisfy a set of similarity criteria with respect to one or more user-provided data samples (e.g., data samples 305). Determining that a given one of the set of data objects satisfies the set of similarity criteria may comprise generating a data object hash value (e.g., root hash value 337) of the given data object and determining that the data object hash value matches a given root hash value stored in a database, which may store one or more root hash values respectively generated from one or more user-provided data samples.

In step 1120, in response to identifying a set of data objects that satisfy the set of similarity criteria, the computer system stores content and behavioral features (e.g., behavioral features 345) associated with the set of data objects in a database.

In step 1130, the computer system generates a plurality of data-defined network (DDN) data structures (e.g., DDN data structures 225) based on the stored content and behavioral features associated with the set of data objects. A given one of the plurality of DDN data structures may include a content class (e.g., content class 330) and one or more behavioral classes (e.g., behavioral classes 340). The content class may be indicative of one or more of the set of data objects that have been grouped based on the one or more data objects having a set of similar content. The one or more behavioral classes may indicate baseline network behavior of the one or more data objects within the content class as determined from evaluation of the network traffic.

In step 1140, the computer system detects, using content and behavioral classes of the plurality of DDN data structures, anomalous data behavior within network traffic. Detecting anomalous data behavior within network traffic based upon the plurality of DDN data structures may comprise: (1) identifying an extracted data object and one or more behavioral features associated with the extracted data object from network traffic and (2) evaluating the extracted data object with respect to a content class and one or more behavioral classes of one of the plurality of DDN data structures. Determining that the extracted data object exhibits anomalous behavior may be based upon a machine learning content classification indicating that the content of the extracted data object differs from expected content.

In step 1150, the computer system prevents the network traffic corresponding to the anomalous data behavior from being transmitted to a device coupled to the network appliance.

An example use case for the techniques discussed above is presented here. It is noted that this use case is merely an example subject to numerous variations in implementation.

Many organizations have sensitive data that has a long shelf life. This data is usually formatted as structured files and stored in a local storage or in the cloud. Such files are often downloaded, accessed, and shared among the employees of the organization or sometimes with entities outside of the organization. Accordingly, it may be desirable to track the use of those files and ensure that they are handled correctly.

DDN system 140 may provide a data management solution that utilizes unsupervised machine learning to learn about data objects 335 and their behavioral features 345. By doing that, DDN system 140 may help businesses to continuously discover sensitive data usage inside their organizations, discover misuse of that sensitive data, and prevent data leakage caused by, e.g., an intentional attack or unintended misuse.

As described above, a DDN system 140 may learn about the sensitive data usage inside a customer's network environment by analyzing a set of data samples 305 and then continuing to discover the data usage and time series data updates inside the customer's networks by using a piecewise hashing algorithm or a content classification model 360. While new data is being discovered, DDN system 140 may continue to learn the usage behavior of the data through the machine learning models. Once the data use behaviors are identified, DDN system 140 may provide the protection to the sensitive data, by detecting and intercepting anomalous network traffic. The DDN architecture described above may facilitate the decoupling of data tracking and protection functions from underlying network infrastructure and further allow continuing protection of data while the underlying network infrastructure is changing.

Inside an enterprise, there are typically records of PII or sensitive personal information (SPI), e.g., of employees and customers. Such information may include, for example, address and phone number information, Social Security numbers, banking information, etc. Usually, records of this type of information are created in enterprise data storage when the customer or employee initially associates with the enterprise, although it could be created or updated at any time during the business relationship. PII/SPI-based records are normally shared by a number of different enterprise applications (e.g., Zendesk, Workday, other types of customer analytics systems or customer relationship management systems) and may be stored inside plain text files, databases, unstructured big data records, or other types of storage across the on-premise file systems or in cloud storage.

Accordingly, a DDN system 140 may classify the PII/SPI data objects 335 into DDN data structures 225 based on the observed data usage behavior. This can enable enterprise users to gain deep visibility into their PII/SPI data usage. The DDN data structures 225, along with other system 140 features such as user interface 520, may assist users in identifying PII/SPI data that may be improperly stored or used, to measure data privacy risk, to verify regulatory compliance, and to learn data relationships across data stores 111. DDN system 140 may continually refine the PII/SPI data usage behavior benchmark based on unsupervised machine learning models (e.g., models 227). Once an accurate behavioral benchmark is established, the enforcement workflow may help customers to control and protect the PII/SPI data from misuse and malicious accesses.

Exemplary Computer System

Figure 12:
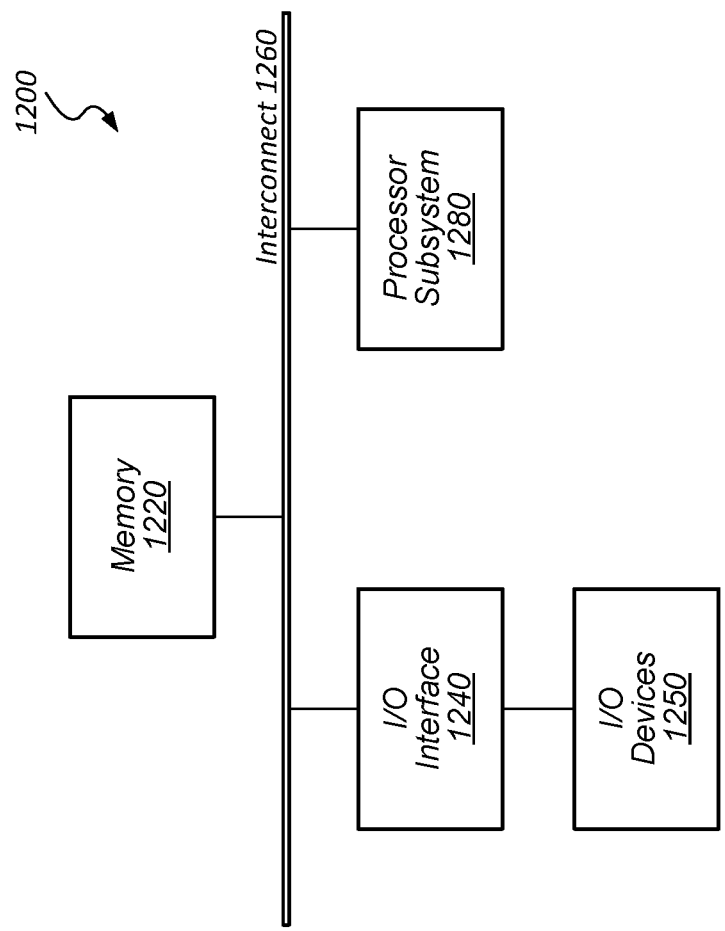
FIG. 12 is a block diagram illustrating an example computer system, according to some embodiments.

Turning now to FIG. 12, a block diagram of an exemplary computer system 1200, which may, for example, implement a computing device 110, a data store 111, a data store 220, and/or a network appliance 120 is depicted. Computer system 1200 includes a processor subsystem 1280 that is coupled to a system memory 1220 and I/O interfaces(s) 1240 via an interconnect 1260 (e.g., a system bus). I/O interface(s) 1240 is coupled to one or more I/O devices 1250. Computer system 1200 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 1200 is shown in FIG. 12 for convenience, system 1200 may also be implemented as two or more computer systems operating together.

Processor subsystem 1280 may include one or more processors or processing units. In various embodiments of computer system 1200, multiple instances of processor subsystem 1280 may be coupled to interconnect 1260. In various embodiments, processor subsystem 1280 (or each processor unit within 1280) may contain a cache or other form of on-board memory.

System memory 1220 is usable store program instructions executable by processor subsystem 1280 to cause system 1200 perform various operations described herein. System memory 1220 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 1200 is not limited to primary storage such as memory 1220. Rather, computer system 1200 may also include other forms of storage such as cache memory in processor subsystem 1280 and secondary storage on I/O Devices 1250 (e.g., a hard drive, storage array, etc.). In some embodiments, these other forms of storage may also store program instructions executable by processor subsystem 1280. In some embodiments, program instructions that when executed implement data manager 210 and/or DDN manager 230 may be included/stored within system memory 1220.

I/O interfaces 1240 may be any of various types of interfaces configured to couple to and communicate with other devices, according to various embodiments. In one embodiment, I/O interface 1240 is a bridge chip (e.g., Southbridge) from a front-side to one or more back-side buses. I/O interfaces 1240 may be coupled to one or more I/O devices 1250 via one or more corresponding buses or other interfaces. Examples of I/O devices 1250 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1200 is coupled to a network via a network interface device 1250 (e.g., configured to communicate over WiFi, Bluetooth, Ethernet, etc.).

Realizations of the subject matter of the application include, but are not limited to, the following examples 1 to 121.

1. A computer-implemented method of controlling data within a computing network, comprising:
    evaluating network traffic to extract and group data objects based on their content satisfying a set of similarity criteria, and to identify typical data behavior with respect to the data objects;
    generating a data-defined network (DDN) data structure indicative of a logical network of data objects, wherein the DDN data structure includes a content class and one or more behavior classes;
        wherein the content class is indicative of one or more of the data objects that have been grouped based on the one or more data objects satisfying the set of similarity criteria;
        wherein the one or more behavior classes indicate typical network behavior of the one or more data objects within the content class as determined from evaluation of the network traffic; and
        wherein the logical network of data objects is represented by the DDN data structure independently of physical infrastructure via which the one or more data objects are stored, communicated, or utilized;
    detecting anomalous data behavior within network traffic utilizing the DDN data structure; and
    in response to detecting the anomalous data behavior, preventing network traffic corresponding to the anomalous data behavior from being communicated via the computing network.
2. The computer-implemented method of example 1, wherein the one or more data objects are one or more files organized within a file system.
3. The computer-implemented method of example 2, wherein the one or more files are stored within cloud-based storage external to the computing network.
4. The computer-implemented method of example 2, wherein the one or more files are stored within one or more storage devices internal to the computing network.
5. The computer-implemented method of any of examples 1 to 4, further comprising receiving one or more user-provided data samples, and wherein determining that a given one of the data objects satisfies the set of similarity criteria comprises comparing content of the given data object to the one or more user-provided data samples.
6. The computer-implemented method of any of examples 1 to 4, further comprising:
    receiving one or more user-provided data samples;
    generating respective root hash values corresponding to the one or more user-provided data samples; and
    storing the root hash values in a similarity database.
7. The computer-implemented method of example 6, wherein determining that content of a given one of the data objects satisfies the set of similarity criteria comprises:
    generating a data object hash value of the given data object; and
    determining that the data object hash value matches a given one of the root hash values stored in the similarity database.
8. The computer-implemented method of example 1, further comprising:
    subsequent to determining that a given one of the one or more data objects satisfies the set of similarity criteria, storing a record of behavior features associated with the given data object.
9. The computer-implemented method of example 8, wherein the record of behavior features includes one or more of the following: an indication of an origin of a request associated with the given data object, an indication of a destination of the request associated with the given data object, an indication of a protocol associated with transmission of the given data object, or an indication of an application type associated with the given data object.
10. The computer-implemented method of examples 8 or 9, wherein the record of behavior features includes one or more of the following: an indication of protocol parameters associated with an application requesting the given data object, an indication of application-specific parameters associated with the application requesting the given data object, an indication of a sequence of network events associated with access to the given data object, or an indication of a type of host associated with the application requesting the given data object.
11. The computer-implemented method of any of examples 8 to 10, wherein the record of behavior features includes one or more of the following: an indication of a frequency of access with respect to the given data object, an indication of a volume of data throughput with respect to the given data object, or an indication of one or more application programming interfaces (APIs) through which the given data object is accessed.
12. The computer-implemented method of any of examples 8 to 11, wherein the record of behavior features includes an indication of a level of security risk associated with one or more of: the given data object, a source of the given data object, or a destination of the given data object.
13. The computer-implemented method of any of examples 8 to 12, further comprising:
    performing machine learning behavior classification based upon the record of behavior features associated with the given data object, wherein the one or more behavior classes of the DDN data structure are based upon the machine learning behavior classification.
14. The computer-implemented method of example 13, wherein performing machine learning behavior classification comprises training a set of convolutional neural networks (CNN) and recurrent neural networks (RNN) dependent on the record of behavior features associated with the given data object.
15. The computer-implemented method of any of examples 8 to 14, further comprising:
    performing machine learning content classification based upon content of the given data object, wherein the content class of the DDN data structure is based upon the machine learning content classification.
16. The computer-implemented method of example 15, wherein performing machine learning content classification comprises training a set of support vector machines (SVMs) and convolutional neural networks (CNN) dependent on the content of the given data object.
17. The computer-implemented method of any of examples 1 to 16, wherein the DDN data structure further includes user-defined rules regarding content or behavior of data objects, wherein the user-defined rules are generated independently of a machine learning classification process.

18. The computer-implemented method of example 1, wherein detecting anomalous data behavior comprises identifying an extracted data object from the network traffic and evaluating the extracted data object with respect to the content class and the one or more behavior classes of the DDN data structure.

19. The computer-implemented method of example 18, wherein the extracted data object corresponds to a file organized within a file system.

20. The computer-implemented method of examples 18 or 19, wherein identifying the extracted data object comprises:
Identifying, from the network traffic, behavior features associated with the extracted data object; and
storing a record of the behavior features associated with the extracted data object.

21. The computer-implemented method of example 20, wherein the record of behavior features includes one or more of the following: an indication of an origin of a request associated with the extracted data object, an indication of a destination of the request associated with the extracted data object, an indication of a protocol associated with transmission of the extracted data object, or an indication of an application type associated with the extracted data object.

22. The computer-implemented method of examples 20 or 21, wherein the record of behavior features includes one or more of the following: an indication of protocol parameters associated with an application requesting the extracted data object, an indication of application-specific parameters associated with the application requesting the extracted data object, or an indication of a type of host associated with the application requesting the extracted data object.

23. The computer-implemented method of any of examples 20 to 22, wherein the record of behavior features includes one or more of the following: an indication of a frequency of access with respect to the extracted data object, an indication of a volume of data throughput with respect to the extracted data object, or an indication of one or more application programming interfaces (APIs) through which the extracted data object is accessed.

24. The computer-implemented method of any of examples 20 to 23, wherein the record of behavior features includes an indication of a level of security risk associated with one or more of: the extracted data object, a source of the extracted data object, or a destination of the extracted object.

25. The computer-implemented method of any of examples 20 to 24, wherein evaluating the extracted data object with respect to the content class and the one or more behavior classes of the DDN data structure comprises performing machine learning content classification based upon content of the extracted data object and the content class of the DDN data structure.

26. The computer-implemented method of example 25, wherein the machine learning content classification is performed using a same machine learning content model that was used for machine learning content classification during generation of the DDN data structure.

27. The computer-implemented method of example 25 or 26, wherein evaluating the extracted data object with respect to the content class and the one or more behavior classes of the DDN data structure further comprises indicating that the extracted data object exhibits anomalous behavior based upon the machine learning content classification indicating that the content of the extracted data object differs from expected content.

28. The computer-implemented method of example 25 or 26, wherein evaluating the extracted data object with respect to the content class and the one or more behavior classes of the DDN data structure further comprises:
determining, based upon the machine learning content classification, that the extracted data object includes data identified as critical; and
in response to determining that the extracted data object includes data identified as critical, performing machine learning behavior classification based upon the record of behavior features associated with the extracted data object and the one or more behavior classes of the DDN data structure.

29. The computer-implemented method of example 28, wherein the machine learning behavior classification is performed using a same machine learning behavior model that was used for machine learning behavior classification during generation of the DDN data structure.

30. The computer-implemented method of example 28 or 29, wherein evaluating the extracted data object with respect to the content class and the one or more behavior classes of the DDN data structure further comprises indicating that the extracted data object exhibits anomalous behavior based upon the machine learning behavior classification indicating that the record of behavior features of the extracted data object differs from expected behavior.

31. The computer-implemented method of example 28 or 29, wherein evaluating the extracted data object with respect to the content class and the one or more behavior classes of the DDN data structure further comprises:
determining, based upon the machine learning behavior classification, that the extracted data object exhibits expected behavior;
in response to determining that the extracted data exhibits expected behavior, determining that the extracted data object fails to satisfy one or more user-specific rules included in the content class of the DDN data structure; and
indicating that the extracted data object exhibits anomalous behavior based upon the extracted data object failing to satisfy one or more of the user-specific rules.

32. The computer-implemented method of any of examples 20 to 24, wherein evaluating the extracted data object with respect to the content class and the one or more behavior classes of the DDN data structure comprises performing machine learning behavior classification based upon the record of behavior features of the extracted data object and the one or more behavior classes of the DDN data structure.

33. The computer-implemented method of example 32, wherein the machine learning behavior classification is performed using a same machine learning behavior model that was used for machine learning behavior classification during generation of the DDN data structure.

34. The computer-implemented method of example 32 or 33, wherein evaluating the extracted data object with respect to the content class and the one or more behavior classes of the DDN data structure further comprises indicating that the extracted data object exhibits anomalous behavior based upon the machine learning behavior classification indicating that the record of behavior features of the extracted data object differs from expected behavior.

35. The computer-implemented method of any of examples 1 to 34, wherein the computing network is coupled to a plurality of client systems, and wherein preventing the network traffic corresponding to the anomalous data behavior from being communicated via the computing network occurs without dependence on any client process executing on any of the plurality of client systems.

36. The computer-implemented method of any of examples 1 to 35, wherein preventing the network traffic corresponding to the anomalous data behavior from being communicated via the computing network occurs independently of configuration changes to physical infrastructure of the computing network.

37. The computer-implemented method of example 36, wherein the configuration changes to physical infrastructure include one or more of: addition or deletion of client systems coupled to the computing network, addition or deletion of server systems coupled to the computing network, addition or deletion of storage systems coupled to the computing network, or changes to a topology of the computing network.

38. The computer-implemented method of any of examples 1 to 37, wherein the content class of the DDN data structure indicates that, based on evaluation of the network traffic, the one or more of the data objects that have been grouped include personally identifiable information (PII), sensitive personal information (SPI), or personal health information (PHI).

39. The computer-implemented method of example 38, wherein the one or more behavior classes of the DDN data structure indicate typical network behavior of the PII, SPI, or PHI, as determined based on evaluation of the network traffic.

40. The computer-implemented method of example 39, wherein detecting anomalous data behavior within network traffic comprises detecting an unauthorized use of the PII, SPI, or PHI within the computing network.

41. The computer-implemented method of example 39 or 40, wherein detecting anomalous data behavior within network traffic comprises detecting an attempt to transfer the PII, SPI, or PHI to a destination external to the computing network.

42. A tangible, non-transitory computer-readable medium that stores program instructions, wherein the program instructions are executable by one or more processors to implement a method according to any of examples 1 to 41.

43. A system, comprising:
one or more processors; and
a memory that stores program instructions, wherein the program instructions are executable by the one or more processors to implement a method according to any of examples 1 to 41.

44. A network appliance, comprising:
a plurality of network ports configured to convey packetized network traffic to or from devices coupled to the network appliance;
one or more processors configured to route the packetized network traffic among the plurality of network ports; and
a memory that stores program instructions executable by the one or more processors to perform a method according to any of examples 1 to 41.

45. A computer-implemented method of controlling data within a computing network, comprising:
extracting data objects and associated behavior features from network traffic;
determining that a given one of the data objects satisfies a set of similarity criteria with respect to one or more user-provided data samples;
performing machine learning content classification on content of the given data object to identify a content class to which the given data object belongs;
performing machine learning behavior classification on one or more behavior features associated with the given data object to identify one or more behavior classes corresponding to the given data object;
storing the content class and the one or more behavior classes within a data-defined network (DDN) data structure, wherein the DDN data structure is indicative of a logical network of data objects represented independently of physical infrastructure via which individual data objects are stored, communicated, or utilized; and
detecting and intercepting anomalous data behavior within network traffic utilizing the DDN data structure.

46. The computer-implemented method of example 45, wherein the data objects are one or more files organized within a file system.

47. The computer-implemented method of example 46, wherein the one or more files are stored within cloud-based storage external to the computing network.

48. The computer-implemented method of example 46, wherein the one or more files are stored within one or more storage devices internal to the computing network.

49. The computer-implemented method of any of examples 45 to 48, wherein determining that the given data object satisfies the set of similarity criteria comprises:
generating a data object hash value of the given data object; and
determining that the data object hash value matches a given root hash value stored in a similarity database, wherein the similarity database stores one or more root hash values respectively generated from the one or more user-provided data samples.

50. The computer-implemented method of any of examples 45 to 49, wherein the one or more behavior features associated with the given data object include one or more of the following: an indication of an origin of a request associated with the given data object, an indication of a destination of the request associated with the given data object, an indication of a protocol associated with transmission of the given data object, or an indication of an application type associated with the given data object.

51. The computer-implemented method of any of examples 45 to 50, wherein the one or more behavior features associated with the given data object include one or more of the following: an indication of protocol parameters associated with an application requesting the given data object, an indication of application-specific parameters associated with the application requesting the given data object, or an indication of a type of host associated with the application requesting the given data object.

52. The computer-implemented method of any of examples 45 to 51, wherein the one or more behavior features associated with the given data object include one or more of the following: an indication of a frequency of access with respect to the given data object, an indication of a volume of data throughput with respect to the given data object, or an indication of one or more application programming interfaces (APIs) through which the given data object is accessed.

53. The computer-implemented method of any of examples 45 to 52, wherein the one or more behavior features associated with the given data object include an indication of a level of security risk associated with one or more of: the given data object, a source of the given data object, or a destination of the given object.

54. The computer-implemented method of any of examples 45 to 53, wherein performing machine learning behavior classification comprises training a set of convolutional neural networks (CNN) and recurrent neural networks (RNN) dependent on the one or more behavior features associated with the given data object.
55. The computer-implemented method of any of examples 45 to 54, wherein performing machine learning content classification comprises training a set of support vector machines (SVMs) and convolutional neural networks (CNN) dependent on the content of the given data object.
56. The computer-implemented method of any of examples 45 to 55, wherein the DDN data structure further includes user-defined rules regarding content or behavior of data objects, wherein the user-defined rules are generated independently of a machine learning classification process.
57. A tangible, non-transitory computer-readable medium that stores program instructions, wherein the program instructions are executable by one or more processors to implement a method according to any of examples 45 to 56.
58. A system, comprising:
    one or more processors; and
    a memory that stores program instructions, wherein the program instructions are executable by the one or more processors to implement a method according to any of examples 45 to 56.
59. A network appliance, comprising:
    a plurality of network ports configured to convey packetized network traffic to or from devices coupled to the network appliance;
    one or more processors configured to route the packetized network traffic among the plurality of network ports; and
    a memory that stores program instructions executable by the one or more processors to perform a method according to any of examples 45 to 56.
60. A computer-implemented method of controlling data within a computing network, comprising:
    identifying an extracted data object and one or more behavior features associated with the extracted data object from network traffic;
    evaluating the extracted data object with respect to a content class and one or more behavior classes of a data-defined network (DDN) data structure, wherein the DDN is indicative of a logical network of data objects represented independently of physical infrastructure via which individual data objects are stored, communicated, or utilized;
    based upon the evaluating, determining that the extracted data object exhibits anomalous behavior; and
    in response to determining that the extracted data object exhibits anomalous behavior, preventing the extracted data object from being communicated via the computing network.
61. The computer-implemented method of example 60, wherein the extracted data object corresponds to a file organized within a file system.
62. The computer-implemented method of example 60 or 61, wherein the one or more behavior features associated with the extracted data object include one or more of the following: an indication of an origin of a request associated with the extracted data object, an indication of a destination of the request associated with the extracted data object, an indication of a protocol associated with transmission of the extracted data object, or an indication of an application type associated with the extracted data object.
63. The computer-implemented method of any of examples 60 to 62, wherein the one or more behavior features associated with the extracted data object include one or more of the following: an indication of protocol parameters associated with an application requesting the extracted data object, an indication of application-specific parameters associated with the application requesting the extracted data object, or an indication of a type of host associated with the application requesting the extracted data object.
64. The computer-implemented method of any of examples 60 to 63, wherein the one or more behavior features associated with the extracted data object include one or more of the following: an indication of a frequency of access with respect to the extracted data object, an indication of a volume of data throughput with respect to the extracted data object, or an indication of one or more application programming interfaces (APIs) through which the extracted data object is accessed.
65. The computer-implemented method of any of examples 60 to 64, wherein the one or more behavior features associated with the extracted data object include an indication of a level of security risk associated with one or more of: the extracted data object, a source of the extracted data object, or a destination of the extracted object.
66. The computer-implemented method of any of examples 60 to 65, wherein evaluating the extracted data object with respect to the content class and the one or more behavior classes of the DDN data structure comprises performing machine learning content classification based upon content of the extracted data object and the content class of the DDN data structure.
67. The computer-implemented method of example 66, wherein the machine learning content classification is performed using a same machine learning content model that was used for machine learning content classification during generation of the DDN data structure.
68. The computer-implemented method of example 66 or 67, wherein determining that the extracted data object exhibits anomalous behavior is based upon the machine learning content classification indicating that the content of the extracted data object differs from expected content.
69. The computer-implemented method of example 66 or 67, wherein evaluating the extracted data object with respect to the content class and the one or more behavior classes of the DDN data structure further comprises:
    determining, based upon the machine learning content classification, that the extracted data object includes data identified as critical; and
    in response to determining that the extracted data object includes data identified as critical, performing machine learning behavior classification based upon the one or more behavior features associated with the extracted data object and the one or more behavior classes of the DDN data structure.
70. The computer-implemented method of example 69, wherein the machine learning behavior classification is performed using a same machine learning behavior model that was used for machine learning behavior classification during generation of the DDN data structure.
71. The computer-implemented method of example 69 or 70, wherein determining that the extracted data object exhibits anomalous behavior is based upon the machine learning behavior classification indicating that the one or more behavior features associated with the extracted data object differ from expected behavior.

72. The computer-implemented method of example 69 or 70, wherein evaluating the extracted data object with respect to the content class and the one or more behavior classes of the DDN data structure further comprises:
   determining, based upon the machine learning behavior classification, that the extracted data object exhibits expected behavior; and
   in response to determining that the extracted data exhibits expected behavior, determining that the extracted data object fails to satisfy one or more user-specific rules included in the content class of the DDN data structure;
   wherein determining that the extracted data object exhibits anomalous behavior is based upon the extracted data object failing to satisfy one of more of the user-specific rules.
73. The computer-implemented method of any of examples 60 to 65, wherein evaluating the extracted data object with respect to the content class and the one or more behavior classes of the DDN data structure comprises performing machine learning behavior classification based upon the one or more behavior features associated with the extracted data object and the one or more behavior classes of the DDN data structure.
74. The computer-implemented method of example 73, wherein the machine learning behavior classification is performed using a same machine learning behavior model that was used for machine learning behavior classification during generation of the DDN data structure.
75. The computer-implemented method of example 73 or 74, wherein determining that the extracted data object exhibits anomalous behavior is based upon the machine learning behavior classification indicating that the one or more behavior features associated with the extracted data object differs from expected behavior.
76. The computer-implemented method of any of examples 60 to 75, wherein the computing network is coupled to a plurality of client systems, and wherein preventing the extracted data object from being communicated via the computing network occurs without dependence on any client process executing on any of the plurality of client systems.
77. The computer-implemented method of any of examples 60 to 76, wherein preventing the extracted data object from being communicated via the computing network occurs independently of configuration changes to physical infrastructure of the computing network.
78. The computer-implemented method of example 77, wherein the configuration changes to physical infrastructure include one or more of: addition or deletion of client systems coupled to the computing network, addition or deletion of server systems coupled to the computing network, addition or deletion of storage systems coupled to the computing network, or changes to a topology of the computing network.
79. A tangible, non-transitory computer-readable medium that stores program instructions, wherein the program instructions are executable by one or more processors to implement a method according to any of examples 60 to 78.
80. A system, comprising:
   one or more processors; and
   a memory that stores program instructions, wherein the program instructions are executable by the one or more processors to implement a method according to any of examples 60 to 78.
81. A network appliance, comprising:
   a plurality of network ports configured to convey packetized network traffic to or from devices coupled to the network appliance;
   one or more processors configured to route the packetized network traffic among the plurality of network ports; and
   a memory that stores program instructions executable by the one or more processors to perform a method according to any of examples 60 to 78.
82. A network appliance, comprising:
   a plurality of network ports configured to convey packetized network traffic to or from devices coupled to the network appliance;
   one or more processors configured to route the packetized network traffic among the plurality of network ports; and
   a memory that stores program instructions executable by the one or more processors to perform operations comprising:
     evaluating the packetized network traffic to identify data that satisfies a set of similarity criteria with respect to one or more user-provided data samples;
     in response to identifying data that satisfies the set of similarity criteria, storing data attributes and events associated with the data in a similarity database;
     generating a content model and a behavior model based upon on collected data attributes and events within the similarity database;
     detecting anomalous data behavior within network traffic based upon one or more of the content model and the behavior model; and
     preventing the network traffic corresponding to the anomalous data behavior from being transmitted to a device coupled to the network appliance.
83. A computer-implemented method of controlling data within a computing network, comprising:
   retrieving a plurality of data samples from one or more storage devices;
   generating a respective plurality of similarity digests from the plurality of data samples;
   storing the plurality of similarity digests within a similarity database;
   collecting data from the computing network, wherein the data includes data attributes and events;
   determining that one or more similarity digests of the collected data correspond to one or more similarity digests within the similarity database;
   based upon the determining and the one or more similarity digests, grouping the collected data with one or more of the plurality of data samples and storing the data attributes and events within the similarity database;
   performing machine learning on the data attributes and events associated with collected data within the similarity database to generate a data content model and a data behavior model;
   evaluating new data received from the computing network with respect to the data content model and the data behavior model to detect an anomaly in behavior of the new data; and
   in response to detecting the anomaly, discarding the new data, thereby preventing the new data from being transmitted to other devices within the computing network.
84. A computer-implemented method of controlling data within a computing network, comprising:
   evaluating network traffic to group data objects based on their content satisfying a set of similarity criteria, and to identify typical network behavior with respect to the data objects;

generating a data structure that includes a content class based on machine learning content classification and one or more behavior classes based on machine learning behavior classification;
   wherein the content class is indicative of one or more of the data objects that have been grouped based on the one or more data objects satisfying the set of similarity criteria;
   wherein the one or more behavior classes indicate typical network behavior of the one or more data objects within the content class as determined from evaluation of the network traffic; and
   detecting anomalous data behavior within network traffic utilizing the data structure; and
   in response to detecting the anomalous data behavior, preventing the network traffic corresponding to the anomalous data behavior from being communicated via the computing network.

85. A computer-implemented method of controlling data within a computing network that includes a plurality of client systems, comprising:
   extracting data objects and associated behavior features from network traffic;
   determining that a given one of the data objects satisfies a set of similarity criteria with respect to one or more user-provided data samples;
   performing machine learning content classification on content of the given data object to identify a content class to which the given data object belongs;
   performing machine learning behavior classification on one or more behavior features associated with the given data object to identify one or more behavior classes corresponding to the given data object;
   storing the content class and the one or more behavior classes within a data structure; and
   detecting and intercepting anomalous data behavior within network traffic utilizing the data structure without dependence on an agent process executing on any of the plurality of client systems.

86. A computer-implemented method of controlling data within a computing network, comprising:
   identifying an extracted data object and one or more behavior features associated with the extracted data object from network traffic;
   evaluating the extracted data object with respect to a content class and one or more behavior classes of a data-defined network data structure, wherein the evaluating includes performing machine learning content classification and machine learning behavior classification;
   based upon the evaluating, determining that the extracted data object exhibits anomalous behavior; and
   in response to determining that the extracted data object exhibits anomalous behavior, preventing the extracted data object from being communicated via the computing network.

87. The computer-implemented method of any of examples 1-41, further comprising:
   receiving a contextual content signature that includes one or more content attributes; and
   evaluating the DDN data structure with respect to the contextual content signature to identify one or more data objects that correspond to the contextual content signature.

88. The computer-implemented method of example 87, further comprising:
   for the one or more data objects that correspond to the contextual content signature, identifying one or more of: usage patterns associated with the one or more data objects, security risks associated with the one or more data objects, or misuse risks associated with the one or more data objects.

89. The computer-implemented method of example 87 or 88, wherein the contextual content signature is configured to identify content of a particular data object as including one or more of: personally identifiable information (PII), sensitive personal information (SPI), or personal health information (PHI).

90. A computer-implemented method of controlling data within a computing network, the method comprising:
   evaluating network traffic to extract and group data objects based on their content satisfying a set of similarity criteria, and to identify baseline data behavior with respect to the data objects;
   generating a set of data-defined network (DDN) data structures that logically group data objects independent of physical infrastructure via which those data objects are stored, communicated, or utilized, wherein a given one of the set of DDN data structures includes a content class and one or more behavioral classes;
   wherein the content class is indicative of one or more of the data objects that have been grouped based on the one or more data objects satisfying the set of similarity criteria; and
   wherein the one or more behavioral classes indicate baseline behavior of the one or more data objects within the content class as determined from evaluation of the network traffic;
   detecting, using content and behavioral classes of the set of DDN data structures, anomalous data behavior within network traffic; and
   in response to detecting the anomalous data behavior, preventing network traffic corresponding to the anomalous data behavior from being communicated via the computing network.

91. The computer-implemented method of example 90, further comprising:
   receiving one or more user-provided data samples;
   generating respective root hash values corresponding to the one or more user-provided data samples; and
   storing the root hash values in a database.

92. The computer-implemented method of example 91, wherein the evaluating includes:
   determining that a given one of the data objects satisfies the set of similarity criteria, including by:
      generating a data object hash value of the given data object; and
      determining that the data object hash value matches a given one of the root hash values stored in the database.

93. The computer-implemented method of example 92, wherein the content class of the given DDN data structure is based upon a machine learning content classification, and wherein the method further comprises:
   performing the machine learning content classification based upon content of the given data object.

94. The computer-implemented method of example 92, further comprising:
   subsequent to determining that the given data object satisfies the set of similarity criteria, storing a record of behavioral features associated with the given data object.

95. The computer-implemented method of example 94, wherein the one or more behavioral classes of the given DDN data structure are based upon a machine learning behavioral classification, and wherein the method further comprises:

performing the machine learning behavioral classification based upon the record of behavioral features associated with the given data object.

96. The computer-implemented method of example 95, wherein performing the machine learning behavioral classification comprises training a set of convolutional neural networks (CNN) and recurrent neural networks (RNN) using the record of behavioral features associated with the given data object.

97. A non-transitory computer-readable medium having program instructions stored thereon that are executable by a computer system to perform operations comprising:

evaluating network traffic within a computing network to group data objects based on their content satisfying a set of similarity criteria, and to identify baseline network behavior with respect to the data objects;

generating a data structure that includes a content class based on machine learning content classification and one or more behavioral classes based on machine learning behavioral classification;

wherein the content class is indicative of one or more of the data objects that have been grouped based on the one or more data objects having a set of similar content;

wherein the one or more behavioral classes indicate baseline network behavior of the one or more data objects within the content class as determined from evaluation of the network traffic; and detecting anomalous data behavior within network traffic utilizing the data structure; and in response to detecting the anomalous data behavior, preventing the network traffic corresponding to the anomalous data behavior from being communicated via the computing network.

98. The computer-readable medium of example 97, wherein detecting anomalous data behavior comprises:

identifying an extracted data object from the network traffic; and evaluating the extracted data object with respect to the content class and the one or more behavioral classes of the data structure.

99. The computer-readable medium of example 98, wherein evaluating the extracted data object with respect to the content class and the one or more behavioral classes of the data structure further comprises:

determining, based upon the machine learning behavioral classification, that the extracted data object does not exhibits expected behavior; and indicating that the extracted data object exhibits anomalous behavior based upon the extracted data object failing to exhibit the expected behavior.

100. The computer-readable medium of example 98, wherein the operations further comprise:

obtaining one or more user-defined rules regarding content or behavior of data objects; and storing the one or more user-defined rules in association with the data structure.

101. The computer-readable medium of example 100, wherein evaluating the extracted data object with respect to the content class and the one or more behavioral classes of the data structure further comprises:

determining, based upon the machine learning behavioral classification, that the extracted data object exhibits expected behavior; and in response to determining that the extracted data exhibits expected behavior, determining that the extracted data object fails to satisfy the one or more user-defined rules included in the data structure; and indicating that the extracted data object exhibits anomalous behavior based upon the extracted data object failing to satisfy the one or more of the user-defined rules.

102. The computer-readable medium of example 97, wherein the operations further comprise:

retrieving a plurality of data samples from one or more storage devices;

generating a respective plurality of root hash values using the plurality of data samples; and storing the plurality of root hash values within a database.

103. The computer-readable medium of example 102, wherein determining that content of a given one of the data objects satisfies the set of similarity criteria comprises:

generating a data object hash value of the given data object; and determining that the data object hash value matches a given one of the root hash values stored in the database.

104. A network device, comprising:

a plurality of network ports configured to communicate packetized network traffic;

one or more processors configured to route the packetized network traffic among the plurality of network ports; and a memory that stores program instructions executable by the one or more processors to perform operations comprising:

evaluating the packetized network traffic to identify data objects that satisfy a set of similarity criteria with respect to one or more user-provided data samples;

in response to identifying a set of data objects that satisfy the set of similarity criteria, storing content and behavioral features associated with the set of data objects in a database;

generating a plurality of data-defined network (DDN) data structures based on the stored content and behavioral features associated with the set of data objects, wherein a given one of the plurality of DDN data structures includes a content class and one or more behavioral classes;

wherein the content class is indicative of one or more of the set of data objects that have been grouped based on the one or more data objects having a set of similar content;

wherein the one or more behavioral classes indicate baseline network behavior of the one or more data objects within the content class as determined from evaluation of the network traffic; and detecting, using content and behavioral classes of the plurality of DDN data structures, anomalous data behavior within network traffic; and preventing the network traffic corresponding to the anomalous data behavior from being transmitted to a device coupled to the network device.

105. The network device of example 104, wherein identifying that a given one of the set of data objects satisfies the set of similarity criteria comprises:

generating a data object hash value of the given data object; and determining that the data object hash value matches a given root hash value stored in a database, wherein the database stores one or more root hash values respectively generated from one or more user-provided data samples.

106. The network device of example 104, wherein detecting anomalous data behavior within network traffic based upon the plurality of DDN data structures comprises:
  identifying an extracted data object and one or more behavioral features associated with the extracted data object from network traffic; and
  evaluating the extracted data object with respect to a content class and one or more behavioral classes of one of the plurality of DDN data structures.
107. The network device of example 106, wherein determining that the extracted data object exhibits anomalous behavior is based upon a machine learning content classification indicating that the content of the extracted data object differs from expected content.
108. The network device of example 104, wherein the operations further comprise:
  implementing a firewall that prevents network traffic from being transmitted to a device coupled to the network device based on that network traffic failing to satisfy one or more port-based rules.
109. The network device of example 104, wherein the network device is one of a network switch or a network router.
110. A system, comprising:
  a plurality of network appliances in a computer network, wherein at least two of the plurality of network appliances are each configured to:
    evaluate traffic in the computer network to extract and group data objects based on their content satisfying a set of similarity criteria, and to identify baseline data behavior with respect to the data objects;
    generate a plurality of data-defined network (DDN) data structures, wherein a given one of the plurality of DDN data structures includes a content class and a set of behavioral classes;
      wherein the content class is indicative of one or more of the data objects that have been grouped based on the one or more data objects satisfying the set of similarity criteria; and
      wherein the set of behavioral classes indicate baseline network behavior of the one or more data objects within the content class as determined from evaluation of the network traffic;
    detecting, using the plurality of DDN data structures, anomalous data behavior within particular traffic in the computer network; and
    in response to detecting the anomalous data behavior, preventing at least a portion of the particular traffic corresponding to the anomalous data behavior from being communicated via that network appliance.
111. The system of example 110, wherein generating the plurality of DDN data structures is performed as part of a learning phase, and wherein the at least two network appliances are each further configured to:
  disseminate, during an enforcement phase, information obtained during the learning phase by providing at least one of the plurality of DDN data structures to another one of the plurality of network appliances.
112. The system of example 110, wherein a first one of the plurality of DDN data structures includes a set of user-defined rules for affecting a behavior of data objects, wherein the set of user-defined rules is different than a set of user-defined rules included in a second one of the plurality of DDN data structures.
113. The system of example 110, further comprising:
  a plurality of client systems coupled to the plurality of network appliances, wherein preventing the network traffic corresponding to the anomalous data behavior from being communicated via the plurality of network appliances occurs without dependence on any data management agent process executing on any of the plurality of client systems.
114. A method, comprising:
  for data objects in a computer network that match data objects in a set of training data, determining, by a computer system during a training phase, operations performed on those data objects;
  generating, by the computer system, metadata that indicates groups of data objects in the computer network, wherein data objects in each group correspond to a respective set of similarity criteria, and wherein the metadata is generated to indicate, for each group of data objects, a baseline set of operations determined to have been performed on data objects within that group during the training phase;
  updating, by the computer system based on user input, the baseline set of operations for a particular group of data objects;
  detecting, by the computer system during an enforcement phase, an anomalous operation on a data object determined to correspond to the particular group of data objects, wherein the anomalous operation is an operation not included in the updated baseline set of operations; and
  preventing, by the computer system, the anomalous operation in response to the detecting.
115. A method, comprising:
  evaluating a set of data stores within a computing network to group data objects in the set of data stores into ones of a set of groups based on a set of similarity criteria;
  extracting a particular data object from network traffic within the computing network;
  determining that the particular object corresponds to one of the set of groups based on the content of the particular object satisfying one or more of the set of similarity criteria;
  determining that the particular data object originated from a particular data store not included in the set of data stores that have been evaluated; and
  evaluating the particular data store to group data objects in the particular data store into the set of groups based on their content satisfying the set of similarity criteria.
116. The method of example 115, wherein the set of data stores are those data stores that store data samples provided by a user to train a set of machine learning models, and wherein the particular data store does not include any of the data samples provided by the user.
117. The method of example 115 or 116, wherein the data objects that satisfy the same set of similarity criteria are grouped in a particular data-defined network (DDN) data structure.
118. A method, comprising:
  evaluating network traffic within a computer network to extract and group data objects based on their content satisfying a set of similarity criteria;
  generating a plurality of data-defined network (DDN) data structures, wherein a given DDN data structure corresponds to a particular group of data objects;
  determining, for each of the plurality of DDN data structures, a user associated with that DDN data structure, wherein the determining includes evaluating content of the data objects in the particular group corresponding to that DDN data structure; and
  presenting, to a particular user via a user device, those DDN data structures that are determined to be associated with the particular user.

119. A method, comprising:
evaluating a set of data objects extracted from network traffic within a computer network to determine a baseline behavior for the set of data objects;
deriving a set of data usage rules based on the baseline behavior determined for the set of data objects;
monitoring network traffic based on the set of data usage rules to detect anomalous behavior for the set of data objects with respect to the baseline behavior;
in response to detecting anomalous behavior for the set of data objects, preventing the network traffic corresponding to that anomalous behavior from being transmitted to a device of the particular user.

120. The method of example 119, wherein detecting the anomalous behavior for the set of data objects includes:
determining that the particular user is retrieving ones of the set of data objects at a rate that deviates from the baseline behavior.

121. The method of example 119 or 120, wherein the set of data usage rules are stored in a particular data-defined network (DDN) data structure.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A computer-implemented method of controlling data within a computing network, the method comprising:
evaluating network traffic to extract and group data objects based on their content and a set of similarity criteria, and to identify baseline data behavior with respect to accesses of the data objects;
generating a set of data-defined network (DDN) data structures that logically group the data objects independent of physical infrastructure via which those data objects are stored, communicated, or utilized, wherein a given one of the set of DDN data structures includes a content class and one or more behavioral classes;
wherein the content class is indicative of one or more of the data objects that have been grouped based on the one or more data objects sharing similar content according to a machine learning classification model; and
wherein the one or more behavioral classes indicate baseline behavior of the one or more data objects as determined from evaluation of the network traffic;
detecting anomalous data behavior within the network traffic, wherein the detecting includes:
extracting a particular data object from the network traffic;
classifying, based on the machine learning classification model, the particular data object into a particular content class; and
in response to the particular content class corresponding to a particular one of the set of DDN data structures, determining whether baseline data behavior of the particular data object classifies into one of one or more behavioral classes of the particular DDN data structure, wherein detection of the anomalous data behavior is based on the determining; and
in response to detecting the anomalous data behavior, preventing network traffic corresponding to the anomalous data behavior from being communicated via the computing network.

2. The computer-implemented method of claim 1, further comprising:
receiving one or more user-provided data samples;
generating respective root hash values corresponding to the one or more user-provided data samples; and
storing the root hash values in a database.

3. The computer-implemented method of claim 2, wherein the evaluating includes:
determining that a given one of the data objects satisfies the set of similarity criteria, including by:
generating a data object hash value of the given data object; and
determining that the data object hash value matches a given one of the root hash values stored in the database.

4. The computer-implemented method of claim 3, further comprising:
subsequent to determining that the given data object satisfies the set of similarity criteria, storing a record of behavioral features associated with the given data object.

5. The computer-implemented method of claim 1, wherein the one or more behavioral classes of the particular DDN data structure are based upon a machine learning behavioral classification, and wherein the determining of whether the baseline data behavior of the particular data object classifies into one of the one or more behavioral classes of the particular DDN data structure includes performing the machine learning behavioral classification upon a record of behavioral features associated with the particular data object.

6. The computer-implemented method of claim 5, wherein the machine learning behavioral classification is based upon a set of convolutional neural networks (CNN) and recurrent neural networks (RNN).

7. A non-transitory computer-readable medium having program instructions stored thereon that are executable by a computer system to perform operations comprising:
evaluating network traffic within a computing network to group data objects based on their content and a set of similarity criteria, and to identify baseline network behavior with respect to accesses of the data objects;
generating a data structure that includes a content class corresponding to a machine learning content classification model and one or more behavioral classes corresponding to a machine learning behavioral classification model;

wherein the content class is indicative of one or more of the data objects that have been grouped based on the one or more data objects having a set of similar content;

wherein the one or more behavioral classes indicate baseline network behavior of the one or more data objects as determined from evaluation of the network traffic; and detecting anomalous data behavior within the network traffic utilizing the data structure, wherein the detecting includes:

extracting a particular data object from the network traffic;

classifying, based on the machine learning content classification model, content of the particular data object; and in response to determining that the particular data object classifies into the content class of the data structure, making a determination on whether baseline network behavior of the particular data object classifies into the one or more behavioral classes of the data structure, wherein detection of the anomalous data behavior is based on the determination; and in response to detecting the anomalous data behavior, preventing the network traffic corresponding to the anomalous data behavior from being communicated via the computing network.

8. The computer-readable medium of claim 7, wherein the making of the determination includes:

determining, based upon the machine learning behavioral classification model, that the particular data object does not classify into the one or more behavior classes and thus does not exhibit expected behavior; and indicating that the particular data object exhibits anomalous behavior based upon the particular data object failing to exhibit the expected behavior.

9. The computer-readable medium of claim 7, wherein the operations further comprise:

obtaining one or more user-defined rules regarding content or behavior of data objects; and storing the one or more user-defined rules in association with the data structure.

10. The computer-readable medium of claim 9, wherein the detecting further includes:

in response to determining that the particular data object exhibits expected behavior according to the machine learning behavioral classification model, determining that the particular data object fails to satisfy the one or more user-defined rules included in the data structure; and indicating that the particular data object exhibits anomalous behavior based upon the particular data object failing to satisfy the one or more user-defined rules.

11. The computer-readable medium of claim 7, wherein the operations further comprise:

retrieving a plurality of data samples from one or more storage devices;

generating a respective plurality of root hash values using the plurality of data samples; and storing the plurality of root hash values within a database.

12. The computer-readable medium of claim 11, wherein determining that content of a given one of the data objects satisfies the set of similarity criteria comprises:

generating a data object hash value of the given data object; and determining that the data object hash value matches a given one of the root hash values stored in the database.

13. A network device, comprising:

a plurality of network ports configured to communicate packetized network traffic;

one or more processors configured to route the packetized network traffic among the plurality of network ports; and a memory that stores program instructions executable by the one or more processors to perform operations comprising:

evaluating the packetized network traffic to identify data objects that satisfy a set of similarity criteria with respect to one or more user-provided data samples;

in response to identifying a set of data objects that satisfy the set of similarity criteria, storing content and behavioral features associated with the set of data objects in a database;

generating a plurality of data-defined network (DDN) data structures based on the stored content and behavioral features associated with the set of data objects, wherein a given one of the plurality of DDN data structures includes a content class and one or more behavioral classes;

wherein the content class is indicative of one or more of the set of data objects that have been grouped based on the one or more data objects sharing similar content according to a machine learning classification model;

wherein the one or more behavioral classes indicate baseline network behavior of the one or more data objects as determined from evaluation of the packetized network traffic; and detecting anomalous data behavior within the packetized network traffic, wherein the detecting includes:

extracting a particular data object from the packetized network traffic;

classifying, based on the machine learning classification model, the particular data object into a particular content class; and in response to the particular content class corresponding to a particular one of the set of DDN data structures, determining whether baseline data behavior of the particular data object classifies into one of one or more behavioral classes of the particular DDN data structure, wherein detection of the anomalous data behavior is based on the determining; and preventing the packetized network traffic corresponding to the anomalous data behavior from being transmitted to a device coupled to the packetized network device.

14. The network device of claim 13, wherein identifying that a given one of the set of data objects satisfies the set of similarity criteria comprises:

generating a data object hash value of the given data object; and determining that the data object hash value matches a given root hash value stored in a database, wherein the database stores one or more root hash values respectively generated from the one or more user-provided data samples.

15. The network device of claim 14, wherein the determining is based upon a machine learning behavioral classification model.

16. The network device of claim 13, wherein the operations further comprise:
   implementing a firewall that prevents network traffic from being transmitted to a device coupled to the network device based on that network traffic failing to satisfy one or more port-based rules.

17. The network device of claim 13, wherein the network device is one of a network switch or a network router.

* * * * *